(12) United States Patent
Linford et al.

(10) Patent No.: US 9,192,915 B2
(45) Date of Patent: Nov. 24, 2015

(54) POROUS COMPOSITE PARTICULATE MATERIALS, METHODS OF MAKING AND USING SAME, AND RELATED APPARATUSES

(75) Inventors: Matthew R. Linford, Orem, UT (US); Andrew E. Dadson, Provo, UT (US); Landon A. Wiest, Provo, UT (US); David S. Jensen, Provo, UT (US)

(73) Assignees: BRIGHAM YOUNG UNIVERSITY, Provo, UT (US); US SYNTHETIC CORPORATION, Orem, UT (US)

( * ) Notice: Subject to any disclaimer, the term of this patent is extended or adjusted under 35 U.S.C. 154(b) by 369 days.

(21) Appl. No.: 12/774,777

(22) Filed: May 6, 2010

(65) Prior Publication Data

US 2010/0213131 A1 Aug. 26, 2010

Related U.S. Application Data

(63) Continuation-in-part of application No. 12/463,899, filed on May 11, 2009, now Pat. No. 9,005,436.

(60) Provisional application No. 61/052,185, filed on May 10, 2008, provisional application No. 61/335,366, filed on Jan. 6, 2010.

(51) Int. Cl.
 B01J 20/32 (2006.01)
 B01J 13/02 (2006.01)
 (Continued)

(52) U.S. Cl.
 CPC .............. B01J 20/3204 (2013.01); B01J 13/02 (2013.01); B01J 13/14 (2013.01); B01J 13/22 (2013.01);
 (Continued)

(58) Field of Classification Search
 CPC ...... B01J 13/02; B01J 13/22; B01J 20/28004; B01J 20/28016; B01J 20/28057; B01J 20/282; B01J 20/285; B01J 20/286; B01J 20/3204; B01J 20/3223; B01J 20/3236; B01J 20/324; B01J 20/3268; B01J 20/3272; B01J 20/3282; B01J 20/3289; B01J 20/3293; B01J 20/3295; B01J 13/14; B01J 2220/52
 USPC .......................... 210/635, 656, 198.2, 502.1
 See application file for complete search history.

(56) References Cited

U.S. PATENT DOCUMENTS

| 3,345,804 A | 10/1967 | Mariani et al. |
| 3,455,841 A | 7/1969 | Mariani et al. |

(Continued)

FOREIGN PATENT DOCUMENTS

| EP | 0306331 | 3/1989 |
| GB | 1236761 | 6/1971 |

(Continued)

OTHER PUBLICATIONS

MAC-MOD Analytical,Inc., "Fused-Core particle technology for hyper-fast and super-rugged HPLC Columns", HALO, 8 pages, Chadds Ford, United States, www.mac-mod.com.

(Continued)

*Primary Examiner* — Ernest G Therkorn
(74) *Attorney, Agent, or Firm* — Dorsey & Whitney LLP

(57) ABSTRACT

In an embodiment, a porous composite particulate material includes a plurality of composite particles. Each composite particle includes an acid-base-resistant core particle at least partially surrounded by one or more layers of acid-base-resistant shell particles. The shell particles are adhered to the core particle by a polymeric layer. The shell particles and/or core particles may be made from an acid-base-resistant material that is stable in harsh chemical conditions. For example, the shell particles and/or core particles may be made from diamond, graphitic carbon, silicon carbide, boron nitride, tungsten carbide, niobium carbide, zirconia, noble metals, acid-base stable highly cross-linked polymers, acid-base stable at least partially cross-linked polymers, titania, alumina, thoria combinations of the foregoing, or other acid-base-resistant materials. The porous composite particulate materials disclosed herein and related methods and devices may be used in separation technologies, including, but not limited to, chromatography and solid phase extraction.

16 Claims, 6 Drawing Sheets

(51) Int. Cl.

| | | |
|---|---|---|
| *B01J 13/14* | (2006.01) | |
| *B01J 13/22* | (2006.01) | |
| *B01J 20/28* | (2006.01) | |
| *B01J 20/282* | (2006.01) | |
| *B01J 20/285* | (2006.01) | |
| *B01J 20/286* | (2006.01) | |

(52) U.S. Cl.
CPC .......... *B01J 20/282* (2013.01); *B01J 20/28004* (2013.01); *B01J 20/285* (2013.01); *B01J 20/286* (2013.01); *B01J 20/28016* (2013.01); *B01J 20/28057* (2013.01); *B01J 20/324* (2013.01); *B01J 20/3223* (2013.01); *B01J 20/3236* (2013.01); *B01J 20/3268* (2013.01); *B01J 20/3272* (2013.01); *B01J 20/3282* (2013.01); *B01J 20/3289* (2013.01); *B01J 20/3293* (2013.01); *B01J 20/3295* (2013.01); *B01J 2220/52* (2013.01)

(56) References Cited

U.S. PATENT DOCUMENTS

| | | | |
|---|---|---|---|
| 3,499,046 | A | 3/1970 | Wall et al. |
| 3,505,785 | A | 4/1970 | Kirkland |
| 3,577,266 | A | 5/1971 | Kirkland |
| 3,664,967 | A | 5/1972 | Stehl |
| 3,782,075 | A | 1/1974 | Kirkland |
| 3,907,985 | A | 9/1975 | Rankin |
| 4,010,242 | A | 3/1977 | Iler et al. |
| 4,029,583 | A | 6/1977 | Ho Chang et al. |
| 4,070,283 | A | 1/1978 | Kirkland |
| 4,101,460 | A | 7/1978 | Small et al. |
| 4,225,463 | A | 9/1980 | Unger et al. |
| 4,298,500 | A | 11/1981 | Abbott |
| 4,431,546 | A | 2/1984 | Hughes et al. |
| 4,438,070 | A | 3/1984 | Stephens et al. |
| 4,519,905 | A | 5/1985 | Stevens et al. |
| 4,571,306 | A | 2/1986 | Kozak |
| 4,705,725 | A | 11/1987 | Glajch et al. |
| 4,913,935 | A | 4/1990 | Lin |
| 5,114,577 | A * | 5/1992 | Kusano et al. ............. 210/198.2 |
| 5,154,822 | A | 10/1992 | Simpson et al. |
| 5,205,929 | A | 4/1993 | Carr et al. |
| 5,270,280 | A | 12/1993 | Ichikawa et al. |
| 5,308,481 | A | 5/1994 | Stalling et al. |
| 5,403,477 | A | 4/1995 | Del Mar |
| 5,429,708 | A | 7/1995 | Linford et al. |
| 5,487,831 | A | 1/1996 | Pirkle et al. |
| 5,653,875 | A | 8/1997 | Betz et al. |
| 5,705,222 | A | 1/1998 | Somasundaran et al. |
| 6,056,877 | A | 5/2000 | Gjerde et al. |
| 6,071,410 | A | 6/2000 | Nau et al. |
| 6,372,002 | B1 | 4/2002 | D'Evelyn et al. |
| 6,406,776 | B1 | 6/2002 | D'Evelyn |
| 6,488,855 | B2 | 12/2002 | Gjerde et al. |
| 6,607,908 | B1 | 8/2003 | Tanga et al. |
| 7,091,271 | B2 | 8/2006 | James et al. |
| 7,118,725 | B2 | 10/2006 | Reinheimer et al. |
| 7,125,945 | B2 | 10/2006 | Shah |
| 7,225,079 | B2 | 5/2007 | Gjerde et al. |
| 7,311,838 | B2 | 12/2007 | Herold et al. |
| 7,326,837 | B2 | 2/2008 | Han et al. |
| 7,427,361 | B2 | 9/2008 | Small et al. |
| 7,622,045 | B2 | 11/2009 | Vane et al. |
| 7,846,337 | B2 | 12/2010 | Chen et al. |
| 8,389,584 | B2 | 3/2013 | Petrov et al. |
| 8,551,765 | B2 | 10/2013 | Okamura et al. |
| 2003/0008413 | A1 | 1/2003 | Kim et al. |
| 2003/0075503 | A1 | 4/2003 | Gjerde et al. |
| 2004/0035787 | A1 | 2/2004 | Tanga et al. |
| 2004/0118762 | A1 | 6/2004 | Xu et al. |
| 2004/0121070 | A1 | 6/2004 | Xu et al. |
| 2004/0202603 | A1 | 10/2004 | Fischer et al. |
| 2004/0223900 | A1 | 11/2004 | Khabashesku et al. |
| 2005/0000900 | A1 | 1/2005 | Huang et al. |
| 2005/0029196 | A1 | 2/2005 | Rhemrev-Boom |
| 2005/0076581 | A1 | 4/2005 | Small et al. |
| 2005/0158549 | A1 | 7/2005 | Khabashesku et al. |
| 2005/0189279 | A1 | 9/2005 | Xu et al. |
| 2005/0269467 | A1 | 12/2005 | Balelo, Jr. |
| 2006/0024434 | A1 | 2/2006 | Wang et al. |
| 2006/0154304 | A1 | 7/2006 | Han et al. |
| 2006/0234269 | A1 | 10/2006 | Asplund et al. |
| 2006/0269467 | A1 | 11/2006 | Khabashesku et al. |
| 2007/0189944 | A1 | 8/2007 | Kirkland |
| 2008/0025905 | A1 | 1/2008 | Wang et al. |
| 2008/0028839 | A1 | 2/2008 | Vail |
| 2008/0277346 | A1 | 11/2008 | Kirkland et al. |
| 2009/0104361 | A1 | 4/2009 | Ma et al. |
| 2009/0194481 | A1 * | 8/2009 | Yilmaz et al. ................. 210/656 |
| 2009/0218276 | A1 | 9/2009 | Linford et al. |
| 2009/0218287 | A1 | 9/2009 | Vail et al. |
| 2009/0221773 | A1 | 9/2009 | Linford et al. |
| 2009/0277839 | A1 * | 11/2009 | Linford ......................... 210/656 |
| 2010/0069567 | A1 | 3/2010 | Petrov et al. |
| 2010/0072137 | A1 | 3/2010 | Linford et al. |
| 2010/0213131 | A1 * | 8/2010 | Linford et al. ................ 210/656 |
| 2011/0049056 | A1 | 3/2011 | Wyndham et al. |
| 2011/0210056 | A1 | 9/2011 | Linford et al. |
| 2014/0353255 | A1 | 12/2014 | Jensen et al. |

FOREIGN PATENT DOCUMENTS

| | | |
|---|---|---|
| GB | 2412370 | 9/2005 |
| JP | 62061632 | 3/1987 |
| JP | 2004-51937 | 2/2004 |
| SU | 858909 | 8/1981 |
| WO | WO 2007095158 | 8/2007 |
| WO | WO 2008/097343 | 8/2008 |
| WO | WO 2009140207 | 11/2009 |
| WO | WO 2010/033903 | 3/2010 |
| WO | WO 2011/106685 | 9/2011 |

OTHER PUBLICATIONS

Sigma-Aldrich, "Supelco Introduces Ascentis Express HPLC Columns for High Speed and High Efficiency Separations," NewsRelease, Feb. 20, 2007, 2 pages, St. Louis, United States, www.sigma-aldrich.com.

MAC-MOD Analytical, Inc., "New Fused-Core Particle Technology for Very Fast HPLC Separations," Technical Report, 2 pages, Chadds Ford, United States, www.mac-mod.com.

K. Zhang, J.Y. Lim, H.J. Choi and Y. Seo, "Core-Shell structured carbon nanotube/poly (methyl methacrylate) composite and its electrorheological characteristics," ScienceDirect, Diamond and Related Materials, vol. 17, Issues 7-10, Jul.-Oct. 2008, 2pages.

J.H. Moon; S. Yang, W. Dong, J.W. Perry, A. Adibi and S.M. Yang, "Core-shell diamond-like silicon photonic crystals from 3D polymer templates created by holographic lithography," Departmental Papers, Optics Express, vol. 14, Issue 13, Jun. 2006, 7 pages, http//repository.upenn.edu/mse_papers/89.

International Search Report and Written Opinion dated Oct. 27, 2009 as issued in International Application No. PCT/US2009/043483 filed May 11, 2009.

Tsubota, Toshiki et al, Chemical Modification of Diamond Surface with Long Alkyl Chain Containing Carboxylic Acid in Benzoyl Peroxide containing Organic Solution, Journal of the Surface Finishing Society of Japan, vol. 54, No. 11, pp. 758-763 (6 pages).

Chen et al., Rapid Separation of Proteins by Reversed Phase HPLC at Elevated Temperatures, Anal. Methods Instrum. 1 (1993) pp. 213-222.

Andersen, et al. Retention and Thermodynamics of Homologous Series in Reversed-Phase Liquid Chomatography, pp. 52-61 (1990).

McCalley, D.V. Advances in Chromatography, vol. 46, CRC Press, Boca Raton, 2008, pp. 305-350.

Grushka et al. Advances in Chromatography, CRC press, Boca Raton, vol. 44, 2005, pp. 45-77.

Scheuermann et al., Abstract of: Palladium Nanoparticles on Graphite Oxide and Its Functionalized Graphene Derivatives as Highly

(56) References Cited

OTHER PUBLICATIONS

Active Catalysts for the Suzuki-Miyaura Coupling Reaction, 2009 American Chemistry Society (1 page), available as of Jul. 30, 2009.
Knox et al, Surface Modification of Porous Graphite for Ion Exchange ChromatographyDepartment of Chemistry, University of Edinburgh, Chromatographia vol. 42, No. 1/2, Jan. 1996—(6 pages).
McAllister et al., Abstract of: Single Sheet Functionalized Graphene by Oxidation and Thermal Expansion of Graphite, Publication Date (Web): May 25, 2007 (1 page).
Derwent_Packing for gas chromatography column—consists of granulated fluorinated graphite, Aug. 30, 1981.
Technical Guide—Fluophase and Fluofix Columns, TG 01-08 (6 pages), available as of Sep. 21, 2009.
Worsley et al., "Soluble graphene derived from graphite fluoride" Chemical Physics Letters, vol. 445, No. 1-3, Aug. 23, 2007, pp. 51-56.
Zhou et al., Evaluation of Expanded Graphite a On-line Solid-phase Extraction Sorbent for High Performance Liquid Chromatographic determination of Trace Levels of DDTs in Water Samples, 2006, vol. 69, No. 4, pp. 9710-9975, Talanta, Elsevier, Amsterdam, NL.
International Search Report and Written Opinion from International Application No. PCT/US2009/057662 dated Dec. 23, 2009.
International Search Report and Written Opinion from International Application No. PCT/US2011/026300 dated Jun. 29, 2011.
U.S. Appl. No. 12/463,899, Oct. 19, 2011, Office Action.
U.S. Appl. No. 12/039,382, Dec. 31, 2008, Restriction Requirement.
U.S. Appl. No. 12/039,382, Feb. 27, 2009, Office Action.
U.S. Appl. No. 12/039,382, Sep. 30, 2009, Office Action.
U.S. Appl. No. 12/039,382, Mar. 17, 2010, Office Action.
U.S. Appl. No. 12/039,382, Jul. 21, 2011, Office Action.
U.S. Appl. No. 12/563,646, Jan. 24, 2012, Office Action.
U.S. Appl. No. 12/563,646, Apr. 6, 2012, Office Action.
U.S. Appl. No. 12/563,646, Jul. 25, 2012, Office Action.
International Search Report and Written Opinion dated Aug. 30, 2011 as issued in International Application No. PCT/US2011/035306 filed May 5, 2011.
Gaurav Saini et al., "Core Shell Diamond as a Support for Solid-Phase Extraction and High-Performance Liquid Chromatography", Analytical Chemistry, vol. 82, No. 11, Jun. 1, 2010.
U.S. Appl. No. 12/463,899, May 16, 2011, Office Action.
U.S. Appl. No. 12/463,899, Jul. 15, 2011, Office Action.
Wiest, Landon A., et al.; "Pellicular Particles with Spherical Carbon Cores and Porous Nanodiamond/Polymer Shells for Reversed-Phase HPCL"; Anal. Chem. 2011, 83, 5488-5501.
Yushin, G.N., et al., Effect of Sintering on Structure of Nanodiamond, Science Direct, 2005, 14, pp. 1721-1729 (9 pages).
Carbonnier et al., Coating of Porous Silica Beads by In Situ Polymerization/Crosslinking of 2-Hydroxypropyl Beta-Cyclodextrin fro Reversed-Phase High Performance Liquid Chromatography Applications. Journal of Applied Polymer Science, vol. 91, pp. 1419-1426, 2004 (8 pages).
Crini et al., Separation of Structural Isomers Using Cyclodextrin-Polymers Coated on Silica Beads. Chromatographia, vol. 40, No. 5/6, pp. 296-302, 1995 (7 pages).
Liu, Yanshen, Investigation of Novel Microseparation Techniques, Department of Chemistry and Biochemistry, Brigham Young University, Aug. 2007 (180 pgs.).
Hamers, R.J. et al., Molecual and Biomolecular Monolayers on Diamond as an Interface to Biology. Diamond and Related Materials, 2005, 14, pp. 661-668.
Krysinski, P., Covalent Adlayer Growth on a Diamond Thin Film Surface. J. Am. Chem. Soc. 2003, 125, 12726-12728.
Clare, T.L. et al., Functional Monolayers for Improved Resistance to Protein Adsorption: Oligo(ethylene glycol)-Modified Silicon and Diamnd Surfaces. Langmuir, 2005, 21, 6344-6355.
Yang, W., et al., Interfacial Electrical Properties of DNA-Modified Diamond Thin Films: Intrinsic Response and Hybridization-Induced Field Effects. Langmuir, 2004, 20, 6778-6787.
Knickerbocker, T., et al., DNA-Modified Diamond Surfaces. Langmuir, 2003, 19, 1938-1942.
Ando, T. et al., Chemical Modification of Diamond Surfaces Using a Chlorinated Surface as an Intermediate State. Diamond and Related Materials, 1996, 5, (10), 1136-1142.
Miller, J.B., et al., Photochemical Modification of Diamond Surfaces. Langmuir, 1996, 12, 5809-5817.
Liu, Y. et al., Functionalization of Nanoscale Diamond Powder: Fluoro-, Alkyl-, Amino-, and Amino Acid-Nanodiamond Derivatives. Chem. Mater. 2004, 16, 3924-3930.
Ando, T. et al., Thermal Hydrogenation of Diamond Surfaces Studied by Diffuse Reflectance Fourier-Transform Infrared, Temperature-Programmed Desorption and Laser Raman Spectroscopy. Journal of the Chemical Society, Faraday Transactions, 1993, 89, 1783-1789.
Jiang, T., et al., FTIR Studies on the Spectral Changes of the Surface Functional Groups of Ultradispersed Diamond Powder Synthesized by Explosive Detonation After Treatment in Hydrogen, Nitrogen, Methane and Air at Different Temperatures. Journal of the Chemical Society, Faraday Transactions, 1996, 92, 3401-3406.
Tse, K.Y., et al., Electrical Properties of Diamond Surfaces Functionalized with Molecular Monolayers, Journal of Physical Chemistry B 2005, 109, 8523-8532.
Wang, S., et al., Spatially Heterogeneous Electrical and Electrochemical Properties of Hydrogen-Terminated Boron-Doped Nanocrystalline Diamond Thin Film Deposidted from an Argon-Rich $CH_4/H_2/Ar/B_2H_6$ Source Gas Mixture. J. Phys. Chem. C. 2007, 111, 3986-3995.
Kondo, T., et al., Fabrication of Covalent SAM/Au Nanoparticle/Boron-Doped Diamond Configurations with a Sequential Self-Assembly Method. Phys. Chem. C. 2007, 111, 12650-12657.
Strother, T., et al., Photochemical Functionalization of Diamond Films. Langmuir 2002, 18, 968-971.
Wang, G. T., et al., Functionalization of Diamond(100) by Diesl—Alder Chemistry. Journal of the American Chemical Society 2000, 122, 744-745.
Hahn, M., et al., Plasma modification of diamond surfaces. Journal of Adhesion Science and Technology 2005, 19, 1039-1052.
Scruggs, B.E., et al., Analysis of Fluorocarbon Plasma-Treated Diamond Powders by Solid_State Fluorine-19 Nuclear Magnetic Resonance. Journal of Physical Chemistry 1993, 97, 9187-9195.
Visbal, H. et al., Ultrasonic Treatment of Acid-Washed Diamond Powder Surface. Journal of the Ceramic Society of Japan 2004, 112, 95-98.
Notsu, H., et al., Introduction of Oxygen-Containing Functional Groups onto Diamond Electrode Surfaces by Oxygen Plasma and Anodic Polarization. Electrochem. Solid-State Lett. 1999, 2, 522-524.
Ohta, R., et al., Organosilane Self-Assembled Monolayers Directly Linked to the Diamond Surfaces. Vac. Sci. Technol. A 2004, 22, 2005-2009.
Nichols, B.M., et al., Photochemical Functionalization of Hydrogen-Terminated Diamond Surfaces: A Structural and Mechanistic Study. Journal of Physical Chemistry B 2005, 109, 20938-20947.
Nakamura, T. et al., ChemicalModification of Diamond Powder Using Photolysis of Perfluoroazooctane. Chemical Communications (Cambridge, England) 2003, 7, 900-901.
Lasseter, T.L., et al., Covalently Modified Silicon and Diamond Surfaces: Resistance to Nonspecific Protein Adsorption and Optimization for Biosensing. Journal of the American Chemical Society 2004, 126, 10220-10221.
Nakamura, T. et al., Photochemical Modification of Diamond Films: Introduction of Perfluorooctyl Functional Groups on Their Surface. Langmuir 2004, 20, 5846-5849.
Tsubota, T., et al., Abstraction of Hydrogen Atoms on Diamond Surface using Benzoyl Peroxide as a Radical Initiator. Diamond and Related Materials 2002, 11, 1374-1378.
Tsubota, T., et al., Chemical Modification of Hydrogenated Diamond Surface Using Benzoyl Peroxides. Physical Chemistry Chemical Physics 2002, 4, 806-811.
Ida, S., et al., Chemical Reaction of Hydrogenated Diamond Surface with Peroxide Radical Initiators. Diamond and Related Materials 2003, 12, 601-05.
Tsubota, T., et al., Chemical Modification of Diamond Surface Using a Diacyl Peroxide as Radical Initiator and CN group-containing

(56) References Cited

OTHER PUBLICATIONS

Compounds for the Introduction of the CN group. Physical Chemistry Chemical Physics 2002, 4, 3881-3886.

Ida, S., et al., Chemical Modification of the Diamond Surface Using Benzoyl Peroxide and Dicarboxylic Acids. Langmuir 2003, 19, 9693-9698.

Tsubota, T., et al., Chemical Modification of Diamond Surface with Various Carboxylic Acids by Radical Reaction in Liquid Phase. Diamond and Related Materials 2004, 13, 1093-1097.

Tsubota, T., et al., Chemical Modification of Diamond Surface with CH3 (CH2)COOH using Benzoyl Peroxide. Physical Chemistry Chemical Physics 2003, 5, 1474-1480.

Linford, M.R., et al., Alkyl Monolayers Covalently Bonded to Silicon Surfaces. Jounal of the American Chemical Society 1993, 115, 12631-12632.

Linford, M.R., et al., Alkyl Monolayers on Silicon Prepared from 1-Alkenes and Hydrogen-Terminated Silicon. Journal of the American Chemical Society 1995, 117, 3145-3155.

Kim, N.Y., et al., Improved Polypyrrole/Silicon Junctions by Surfacial Modification of Hydrogen-Terminated Silicon Using Organolithium Reagents. J. Am. Chem. Soc. 1999, 121, 7162.

Vermeir, I.E., et al., Electrical Properties of Covalently Linked Silicon/Polypyrrole Junctions. Appl. Phys. Lett. 1999, 74, 3860.

Fabre, B., et al., Functionalization of Si(111) surfaces with alkyl chains terminated by electrochemically polymerizable thienyl units. Chem. Commun. 2002, 2904-2905.

Fabre, B., et al., Photoelectrochemical Generation of Electronically Conducting Polymer-Based Hybrid Junctions on Modified Si(111) Surfaces. J. Phys. Chem. B. 2003, 107, 14326-14335.

Fu, G.D., et al., Deposition of Nanostructured Fluoropolymer Films on Silicon Substrates via Plasma Polymerization of Allylpentafluorobenzene. J. Phys. Chem. B. 2003, 107, 13902-13910.

Cicero, R.L., et al., Olefin Additions on H-Si(111): Evidence for a Surface Chain Reaction Initiated at Isolated Dangling Bonds. Langmuir 2002, 18, 305-307.

Cicero, R.L., et al., Photoreactivity of Unsaturated Compounds with Hydrogen-Terminated Silicon (111)Langmuir 2000, 16, 5688-5695.

Tillman, N., et al., Incorporation of Phenoxy Groups in Self-Assembled Monalayers of Trichlorosilane Derivatives: Effects on Film Thickness, Wettability, and Molecular Orientation. J.Am.chem.Soc. 1988, 110, 6136-6144.

Lee, M.V., et al., Nanografting of Silanes on Silicon Dioxide with Applications to DNA Localization and Copper Electroless Deposition. Chem. Mater. 2007, 19, 5052-5054.

Chan, K., et al., Initiated CVD of Poly(methyl methacrylate) Thin Films. Chem. Vap. Deposition 2005, 11, 437-443.

Nesterenko, P.N., et al., Microdispersed sintered nanodiamonds as a new stationary phase for high-performance liquid chromatography. Analyst 2007, 132, 403-405.

Nesterenko, P.N., et al., Ion chromatographic investigation of the ion-exchange properties of microdisperese sintered nanodiamonds. Chromatogr., A 2007, 1155, 2-7.

Dyer, M.A., Protein Adhesion on Silicon-Supported Hyperbranched Poly(ethylene glycol) and Poly(allylamine) Thin Films. Langmuir 2007, 23, 7018-7023.

Sabu, S., et al., Peptide analysis: Solid phase extraction-elution on diamond combined with atmospheric pressure matrix-assited laser desorption/ionization-Fourier transform ion cyclotron resonance mass spectrometry. Anal. Biochem. 2007, 367, 190-200.

Chen, W.H., et al., Solid-Phase Extraction and Elution on Diamond (SPEED): A Fast and General Platform for Proteome Analysis with Mass SpectrometryAnal. Chem. 2006, 78, 4228-4234.

Kong, X.L., et al., Polylysine-Coated Diamond Nanocrystals for MALDI-TOF Mass Analysis of DNA Oligonucleotides, Anal. Chem. 2005, 77, 4273-4277.

Kalunzny, M.A., et al., J. Lipid, Rapid separation of lipd classes in high yield and purity using bonded phase columns, 1985, 26, 135-140.

Bateman, H. G., et al., Method for Extraction and Separation by Solid Phase Extraction of Neutral Lipid, Free Fatty Acids, and Polar Lipid from Mixed Microbial Cultures. J. Agric. Food Chem. 1997, 45, 132-134.

Bodennec, J. et al., Journal of Lipid Research. A procedure for fractionation of sphingolipid classes by solid-phase extraction on aminopropyl cartridges. 2000, 41, 1524-1531.

Akesson-Nilsson, G.J., Isolation of Chlorinated Fatty Acid Methyl Esters Derived from Cell-Culture Medium and From Fish Lipids by Using an Aminopropyl Solid-Phase Extraction Column. Chromatogr., A 2003, 996, 173-180.

Ushizawa, K., et al., Covalent Immobilization of DNA on Diamond and it's Verification by Diffuse Refelctance Infrared Spectroscopy. Chem. Phys. Lett. 2002, 351, 105-108.

Harris et al. Synthetis of Passivating, Nylon-Like Coatings through Cross-Linking of Ultrathin Polyelectrolyte Filsm. J. Am. Chem. Soc. 1999, 121, 1978-1979.

Zhang, J. et al., FTIR Spectroscopic Evidence for the Involvement of an Acidic Residue in Quinone Binding in Cytochrome bd from *Escherichia coli*.Biochemistry 2002, 41, 4612-4617.

Decker, C., The Use of UV Irradiation in Polymerization, Polymer International, vol. 45, No. 2, 1998, pp. 133-141 (9pgs).

Pascault et al., Thermosetting Polymers: Introduction. Marcel Dekker, Inc. NY, NY. 2002. 6 pages.

Buehler Sum-met—Buehler Sum-met The Science Behind Materials Preparation, Polishing, 2007, 8 pages.

Teutenberg, et al. High Temperature Liquid Chromatography—A Brief Review About an Emerging Technique. Chromatography Today. 2010, 4 pages.

McNeff, et al. Practice and theory of high temperature liquid chromatography. J. Sep. Scie. 2007, 30, pp. 1672-1985.

Teutenberg, et al. Potential of high temperature liquid chromatography for the improvement of separation efficienty—A review. Analytica Chimica Acta 643, 2009, pp. 1-12.

Giegold et al. Determination of sulfonamides and trimethoprim using high temperature HPLC with simultaneous temperature and solvent gradient. J. Sep. Sci. 2008, 31, pp. 3497-3502.

Li, et al. Effect of Temperature on the Thermodynamic Properties, Kinetic Performance, and Stability of Polybutadiene-Coated Zirconia. Anal. Chem. 1997, 69, pp. 837-843.

Xiang, et al. Elevated-Temperature Ultrahigh-Pressure Liquid Chromatography Using Very Small Polybutadiene-Coated Nonporous Zirconia Particles. J. Chromatography, 983, 2003, pp. 83-89.

Greibrokk, et al. Temperature programming in liquid chromatography. J. Sep. Sci. 2001, 24, pp. 899-909.

Dolan et al. Reversed-phase liquid chromatographic separation of complex samples by optimizing temperature and gradient time III. Improving the accuracy of computer simulation. Journal of Chromatography, 857, 1999, p. 41-68.

Guillarme et al. Effect of temperature in reversed phase liquid chromatography. J. of Chromatography, 1052, 2004, pp. 39-51.

Molander et al. Determination of retinoids by packed-capillary liquid chromatography with large-volume on-column focusing and temperature optimization. J. of Chromatography, 847, 1999, pp. 59-68.

Gagliardi et al. Modeling Retention and Selectivity as a Function of pH and Column Temperature in Liquid Chromatography. Anal. Chem. 2006, 78, 5858-5867.

Teutenberg et al. High-temperature liquid chromatography. Part III: Determination of the static permittivities of pure solvents and binary solvent mixtures—Implications for liquid chromatographic separations. J. of Chromatography, 1216, 2009, pp. 8480-8487.

Godin et al. Temperature-Programmed High-Performance Liquid Chromatography Coupled to Isotope Ratio Mass Spectromety. Anal. Chem, 2008, 7144-7152.

Boer et al. High-Temperature Liquid Chromatography Coupled On-Line to a Continuous-Flow Biochemical Screening Assay with Electrospray Ionization Mass Spectrometric Detection. Anal. Chem. 2005, 77, pp. 7894-7900.

Louden et al. High temperature reversed-phase HPLC using deuterium oxide as a mobile phase for the separation of model pharmaceuticals with multiple on-line spectroscopic analysis. Analyst, 2001, pp. 1625-1629.

(56) References Cited

OTHER PUBLICATIONS

Yang et al. HPLC Separations with Micro-Bore Columns Using High-Temperature Water and Flame Ionization Detection. Journal of Chromatographic Science, vol. 43, 2005, 4 pages.
Vervoort et al. Characterisation of reversed-phase stationary phases for the liquid chromatographic analysis of basic pharmaceuticals by thermodynamic data. J. Chromatography, 964, 2002, pp. 67-76.
Gritti et al. Adsorption Mechanisms and Effect of Temperature in Reversed-Phase Liquid Chromatography. Meaning of the Classical Van't Hoff Plot in Chromatography. Anal. Chem. 2006, pp. 4642-4653.
Liu et al. Evaluation of a C18 hybrid stationary phase using high-temperature chromatography. Analytica Chimica, 2005, pp. 144-151.
McCalley et al. The challenges of the analysis of basic compounds by high performance liquid chromatography: Some possible approaches for improved separations. Journal of Chromatography A, 1217 (2010) 858-880.
Neue et al. Dependence of reversed-phase retention of ionizalbe analytes on pH, concentration of organic solvent and silanol activity. J. of Chromatography, 925, 2001, pp. 49-67.
McCalley et al. Comparative evaluation of bonded-silica reversed-phase columns for high-performance liquid chromatography using strongly basic compounds and alternative organic modifiers buffered at acid pH. J. of Chromatography, 769, 1997, pp. 169-178.
McCalley et al. Comparison of the performance of conventional C18 phases with others of alternative functionality for the analysis of basic compounds by reversed-phase high-performance liquid chromatography. J. of Chromatography, 844, 1999, pp. 23-38.
McCalley et al. Effect of temperature and flow-rate on analysis of basic compounds in high-performance liquid chromatography using a reversed-phase column. Journal of Chromatography, 902, 2000, pp. 311-321.
Saini et al. Core-Shell Diamond as a Support for Solid-Phase Extraction and High-Performance Liquid Chromatography. Anal. Chem. 2010, 82, pp. 4448-4456.
Saini et al. C18, C8, and perfluoro reversed phases on diamond for solid-phase extraction. Jounal of Chromatography, 1216, 2009, pp. 3587-3593.
Saini et al. Amino-Modified Diamond as a Durable Stationary Phase for Solid-Phase Extraction. Anal. Chem. 2008, 80, pp. 6253-6259.
Saini et al. Directing polyallylammine adsorption on microlens array patterned silicon for microarray fabrication. Lab Chip, 2009, 9, pp. 1789-1796.
Chester et al. Effect of phase ratio on van't Hoff analysis in reversed-phase liquid chromatography, and phase-ratio-independent estimation of transfer enthalpy. Journal of Chromatography, 1003, 2003, pp. 101-111.
Antia et al. High-Performance Liquid Chromatography at Elevated Temperatures: Examination of Conditions for the Rapid Separation of Large Molecules. Elsevier Science Publishers. 1987, 15 pages.
International Search Report and Written Opinion from International Application No. PCT/US2011/060834 dated Mar. 29, 2012.
U.S. Appl. No. 12/039,382, Dec. 31, 2008, Office Action.
U.S. Appl. No. 12/040,638, Feb. 9, 2009, Office Action.
U.S. Appl. No. 12/040,638, Aug. 4, 2009, Office Action.
U.S. Appl. No. 12/040,638, Jan. 26, 2010, Office Action.
U.S. Appl. No. 12/040,638, Aug. 6, 2010, Office Action.
U.S. Appl. No. 13/035,597, Jan. 24, 2013, Office Action.
U.S. Appl. No. 13/035,597, Sep. 26, 2013, Office Action.
U.S. Appl. No. 13/297,052, Oct. 11, 2013, Notice of Allowance.
U.S. Appl. No. 14/152,375, filed Jan. 10, 2014, Linford et al.
U.S. Appl. No. 12/039,382, Jan. 21, 2014, Office Action.
U.S. Appl. No. 13/297,052, Feb. 5, 2014, Issue Notification.
U.S. Appl. No. 12/039,382, filed Feb. 28, 2008, Linford et al.
U.S. Appl. No. 12/040,638, filed Feb. 29, 2008, Linford et al.
U.S. Appl. No. 13/297,052, filed Nov. 15, 2011, Linford et al.
U.S. Appl. No. 61/868,186, filed Aug. 21, 2013, Jensen.
U.S. Appl. No. 14/642,332, filed Mar. 9, 2015, Linford.
Li, et al.; "Enhancement of thermal stability of poly(divinylbenzene) microspheres" *Materials Letters* 62 (2008) pp. 179-182.
Li, et al. "Synthesis of Monodisperse Poly (divinylbenzene) Microspheres" *Journal of Polymer Science: Part A: Polymer Chemistry*, 1993, vol. 31, pp. 3257-3263 (1993).
Bai, F. et al.; "Synthesis of Narrow or Monodisperse Poly(divinylbenzene) Microspheres by Distillation—Precipitation Polymerization" *Macromolecules* 2004, 37, pp. 9746-9752.
Li, W. et al.; "Monodisperse Cross-Linked Core-Shell Polymer Microspheres by Precipitation Polymerization" *Macromolecules* 2000, 33, pp. 4354-4360.
Moreno-Castilla et al.; "Activated Carbon Surface Modifications by Nitric Acid, Hydrogen Peroxide, and Ammonium Peroxydisulfate Treatments" *Langmuir* 1995, 11, pp. 4386-4392.
El-Hendawy; "Influence of HNO oxidation on the structure and adsorptive properties of corncob-based activated carbon" A.N.A, *Carbon* 2003, 41, pp. 713-722.
Winslow, et al.; "Formation and Properties of Polymer Carbon" Journal of Polymer Science, vol. XVI, pp. 101-120 (1955).
Hung, et al.; "Improved Efficiency of Reversed Phase Diamond/Carbon Core-Shell Particles for HPLC Using Carbonized, Poly(Divinylbenzene) (PDVB) Microspheres as the Carbon Core Materials" Department of Chemistry and Biochemistry and Department of Physics & Astronomy, Brigham Young University (2013).
Zhang, "Fluorocarbon stationary phases for liquid chromatography applications" Journal of Florine Chemistry 129 (2008) 910-919.
Mutig et al., "Synthesis and molecular structures of heptafluoroisopropylated fullerenes: C60 (i-C3F7)8, C60(i-C3F7)6, and C60(CF3)2(i-C3F7)2" Journal of Fluorine Chemistry 130 (2009) 241-247.
Chen et al., "Perfluoroalkylations and perfluorooxaalkylations. Part 3. Chloro-substituted diazines as substrates in copper-mediated cross-coupling" Journal of Fluorine Chemistry 73 (1995) 113-119.
Chen et al., "Polyfluoroalkylation of Bromoaromatic Compounds Via Perfluoro-Alkylcopper Intermediates" Journal of Fluorine Chemistry, 43 (1989) 207-228.
Cowell et al., "Fluoroalkylation of Aromatic Compounds" Journal of Fluorine Chemistry, 17 (1981) 345-356.
Fagan et al., "Production of Perfluoroalkylated Nanospheres from Buckminsterfullerene" Science, vol. 262, Oct. 15, 1993.
Tamm et al., Synthesis, structural investigation, and theoretical study of pentafluoroethyl derivatives of [60] fullerene, Russian Chemical Bulletin, International Edition, vol. 56, No. 5, pp. 915-921, May 2007.
Troyanov et al., "Higher trifluoromethylated derivatives of C60, C60(CF3)16 and C60(CF3)18 Synthesis, structure, and theoretical study" Journal of Fluorine Chemistry 128 (2007) 545-551.
D'Agostino et al., "Plasma Deposition, Treatment, and Etching of Polymers" Plasma Polymerization of Fluorocarbons (1990) pp. 142-162.
Reynolds, "Physical Properties of Graphite", Elsevier Publishing Co Ltd., pp. 1-32, and 63-129 (1968).
Ross, "The Role of Porous Graphite Carbon in HPLC" LCGC Europe; May 2000, vol. 13, No. 5; pp. 310-319.
U.S. Appl. No. 12/463,899, Dec. 8, 2014, Notice of Allowance.
U.S. Appl. No. 12/463,899, Mar. 25, 2015, Issue Notification.
U.S. Appl. No. 12/040,638, Feb. 28, 2014, Office Action.
U.S. Appl. No. 12/040,638, Oct. 14, 2014, Office Action.
U.S. Appl. No. 12/040,638, Mar. 4, 2015, Office Action.
U.S. Appl. No. 12/563,646, Mar. 5, 2015, Notice of Allowance.
U.S. Appl. No. 13/408,059, Aug. 25, 2014, Office Action.
U.S. Appl. No. 13/408,059, Oct. 27, 2014, Office Action.
U.S. Appl. No. 13/408,059, Feb. 10, 2015, Office Action.
U.S. Appl. No. 14/463,525, Feb. 6, 2015, Office Action.
U.S. Appl. No. 14/152,375, May 22, 2015, Notice of Allowance.
U.S. Appl. No. 13/035,597, Apr. 15, 2013, Office Action.
Kudryavtsev, On the Kinetics of Polyacrylamide Alkaline Hydrolysis, Macromolecules, vol. 31, Mar. 3, 1998, 4642-4644 (3pp.).
Rabieee et al., Synthesis of High Molecular Weight Partially Hydrolyzed Polyacrylamide and Investigation on its Properties, Iranian Polymer Journal, vol. 14, No. 7, 2005 (6 pp.).
Zeynali et al., Alkaline Hydrolysis of Polyacrylamide and Study on Poly(acrylamide-co-sodium acrylate) Properties, Iranian Polymer Journal, vol. 11, No. 4, 2002 (7 pp.).

(56) References Cited

OTHER PUBLICATIONS

U.S. Appl. No. 12/039,382, Jan. 20, 2012, Office Action.
U.S. Appl. No. 12/039,382, Jul. 15, 2013, Office Action.
U.S. Appl. No. 12/040,638, Feb. 28, 2013, Office Action.
U.S. Appl. No. 12/040,638, Aug. 29, 2013, Office Action.
U.S. Appl. No. 13/297,052, Aug. 19, 2013, Office Action.
U.S. Appl. No. 12/563,646, Oct. 16, 2015, Notice of Allowance.
U.S. Appl. No. 13/035,597, Oct. 2, 2015, Notice of Allowance.
U.S. Appl. No. 14/152,375, Oct. 15, 2015, Notice of Allowance.

* cited by examiner

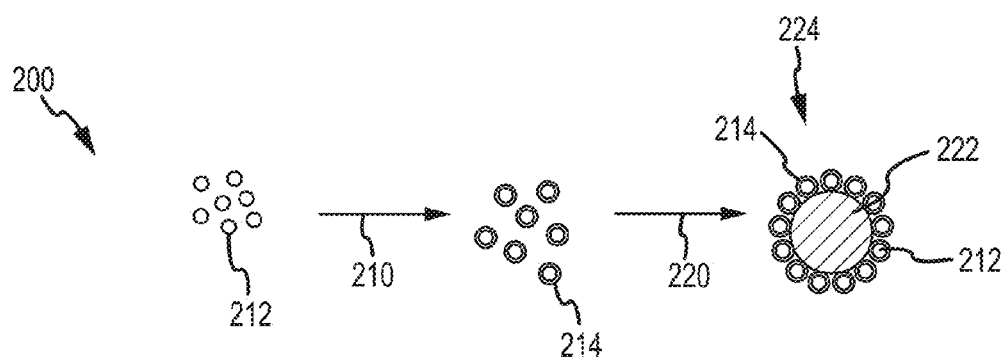
FIG.2
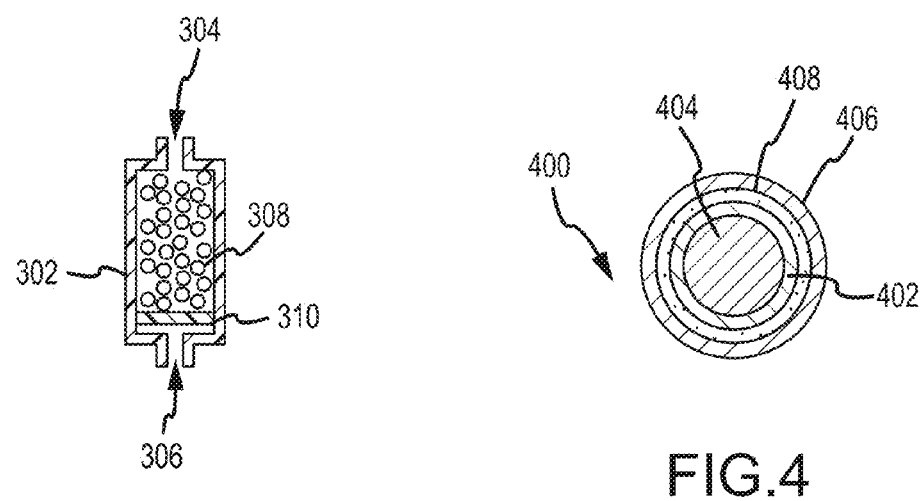
FIG.3
FIG.4

POROUS COMPOSITE PARTICULATE MATERIALS, METHODS OF MAKING AND USING SAME, AND RELATED APPARATUSES

CROSS-REFERENCE TO RELATED APPLICATIONS

This application is a continuation-in-part of U.S. patent application Ser. No. 12/463,899, entitled "Porous Composite Particulate Materials, Methods of Making and Using Same, and Related Apparatuses," filed on 11 May 2009, which claims the benefit of U.S. Provisional Application No. 61/052,185 filed on 10 May 2008, entitled "Synthesis of Porous Diamond Particles," both of which are hereby incorporated herein, in their entirety, by this reference. This application also claims the benefit of U.S. Provisional Application No. 61/335,366 filed on 6 Jan. 2010, entitled "Use of Spherical Micron-sized Inorganic/Organic Material, Coated with Poly(allyamine) and Nanodiamond for use in HPLC."

BACKGROUND

Chromatography and solid-phase extraction ("SPE") are commonly-used separation techniques employed in a variety of analytical chemistry and biochemistry environments. Chromatography and SPE are often used for separation, extraction, and analysis of various constituents, or fractions, of a sample of interest. Chromatography and SPE may also be used for the preparation, purification, concentration, and clean-up of samples.

Chromatography and SPE relate to any of a variety of techniques used to separate complex mixtures based on differential affinities of components of a sample carried by a mobile phase with which the sample flows, and a stationary phase through which the sample passes. Typically, chromatography and SPE involve the use of a stationary phase that includes an adsorbent packed into a cartridge or column. A commonly-used stationary phase includes a silica-gel-based sorbent material.

Mobile phases are often solvent-based liquids, although gas chromatography typically employs a gaseous mobile phases. Liquid mobile phases may vary significantly in their compositions depending on various characteristics of the sample being analyzed and on the various components sought to be extracted and/or analyzed in the sample. For example, liquid mobile phases may vary significantly in pH and solvent properties. Additionally, liquid mobile phases may vary in their compositions depending on the characteristics of the stationary phase that is being employed. Often, several different mobile phases are employed during a given chromatography or SPE procedure. Stationary phase materials may also exhibit poor stability characteristics in the presence of various mobile phase compositions and/or complex mixtures for which separation is desired. The poor stability characteristics of stationary phase materials in some mobile phases and complex mixtures, in some cases, may even preclude the possibility of using chromatography or SPE to perform the desired separation.

SUMMARY

Embodiments disclosed herein are directed to porous composite particulate materials, related methods of manufacture, and devices that incorporate such porous composite particulate materials for use in separation technologies, including, but not limited to, chromatography and solid phase extraction. In an embodiment, a porous composite particulate material includes a plurality of composite particles. Each composite particle includes an acid-base-resistant core particle at least partially surrounded by one or more layers of acid-base-resistant shell particles. The shell particles may be bonded to the core particles by a polymeric layer of one or more polymers, which is acid-base resistant. For example, the polymeric layer may be highly cross-linked to provide mechanical stability, while still providing sufficient chemical stability. The shell particles and/or core particles may also be made from a material that is stable in harsh chemical conditions. For example, the shell particles and/or core particles may be made from diamond, graphitic carbon, silicon carbide, boron nitride, tungsten carbide, niobium carbide, combinations thereof, or other suitable acid-base-resistant material that is chemically stable in acids and bases over a wide pH range. Examples of other acid-base-resistant materials from which the shell particles and/or core particles may be made include zirconia, noble metals, acid-base stable highly cross-linked polymers, acid-base stable at least partially cross-linked polymers, titania, alumina, thoria or combinations of the foregoing. In one embodiment, the shell particles comprise diamond, a diamond-like material, a graphitic material, or combinations of the foregoing, and the core particles are selected to be generally spherical.

The one or more polymers used to adhere the shell particles to the core particles and/or to each other may also be selected to be stable in harsh chemical conditions. For example, in one embodiment, the one or more adhering polymer may be an amine polymer. The one or more adhering polymers may also be cross-linked (e.g., using epoxide moieties) to add mechanical strength to polymeric binding matrix and/or include functionalizing moieties (e.g., anionic moieties) to give the composite particulate material desired properties for separating components of a mobile phase. In another embodiment, the adhering polymers may also be substantially neutral polymers (i.e., non-ionic). Substantially neutral polymers may have a few ionic groups so long as the molecule is large enough that the molecule behaves similar to typical non-ionic polymers (e.g., a PMMA molecule having a few amines). An example of a substantially neutral polymer is polyallylamine because the neutral amines on polyallylamine remain largely unprotonated in an aqueous solution.

The shell particles may be bonded to the outside of the core particle to achieve a composite particle with a desired size and/or surface area. Moreover, the relative size of the core particles and shell particles and the number of layers of shell particles may be selected to provide composite particles with a surface area and porosity suitable for chromatography and/or solid phase extraction. The use of core particles bonded to shell particles provides combinations of particle sizes and surface areas that may not be possible with simple mixtures of un-bonded particles of the same material.

In one embodiment, a method for manufacturing a porous composite particulate material includes providing a plurality of acid-base-resistant core particles and a plurality of acid-base-resistant shell particles. At least a portion of the core particles, at least a portion of the shell particles, or both may be coated with polymeric material. A portion of the shell particles are adhered to each core particle to form a plurality of composite particles. For example, each core particle may have a plurality of shell particles bonded thereto by the polymer material.

In another embodiment, a separation apparatus for performing chromatography or solid phase separation is described. The separation apparatus includes a vessel having an inlet and an outlet. Any of the porous composite particulate materials disclosed herein may be disposed within the vessel. The vessel may be a column or a cassette suitable for use in the fields of chromatography and/or solid phase separation (e.g., high performance liquid chromatography ("HPLC") and ultra performance liquid chromatography ("HPLC")).

The separation apparatus may be used to physically separate different components from one another. In one embodiment, a mobile phase including at least two different components to be separated is caused to flow through the composite particulate material to physically separate the at least two different components. At least one of the two different components is recovered.

In one embodiment, the composite particles are made from diamond, graphitic carbon, silicon carbide, boron nitride, tungsten carbide, niobium carbide, combinations thereof, or other suitable acid-base-resistant material that is stable in chemically harsh conditions. Examples of other acid-base-resistant materials include zirconia, noble metals, acid-base stable highly cross-linked polymers, acid-base stable at least partially cross-linked polymers, titania, alumina, thoria, or combinations of the foregoing. The composite particles in some cases may be used with a mobile phase that would typically degrade commonly used stationary phase materials, such as a silica gel. In the case where diamond particles are used as core particles and/or shell particles, the mobile phase may include organic solvents, which are useful for separating lipids.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the invention, wherein identical reference numerals refer to identical elements or features in different views or embodiments shown in the drawings.

FIG. 2 is a schematic diagram illustrating another method for making a composite particulate material according to an embodiment;

FIG. 3 is a cross-sectional view of a vessel used for forming a body of bonded composite particles according to an embodiment;

FIG. 4 is a cross-sectional view of a composite particle according to an embodiment;

DETAILED DESCRIPTION

Figure 1:
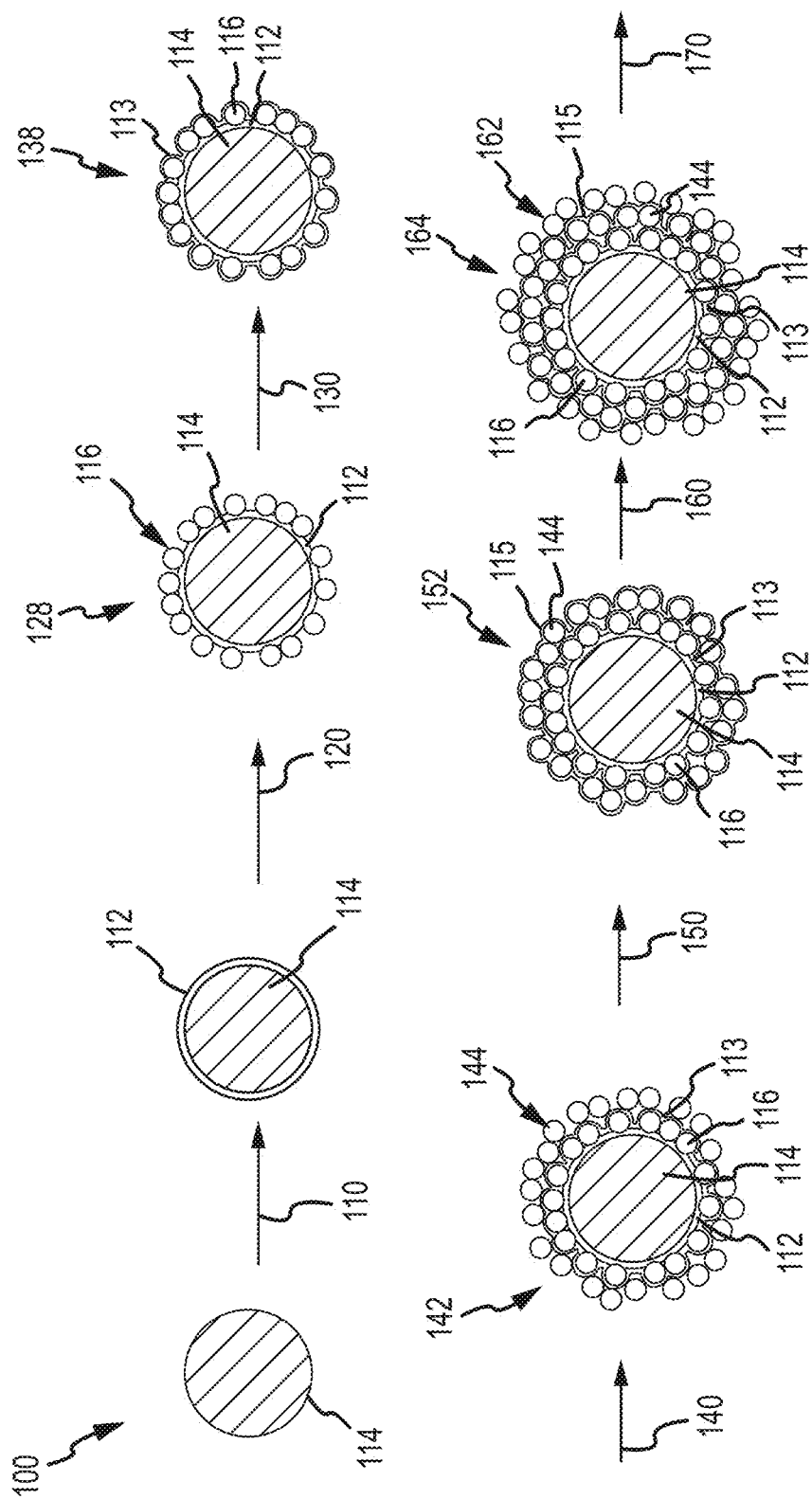
FIG. 1 is a schematic flow diagram illustrating a method for making a composite particulate material according to an embodiment.

I. Components Used to Make Porous Composite Particulate Materials

A. Acid-Base-Resistant Particles

The porous composite particulate materials disclosed herein include a plurality of composite particles. Each composite particle includes an acid-base-resistant core particle, and a plurality of acid-base-resistant shell particles that at least partially surround and are bonded to the core particle by a polymeric layer of polymer material to impart a desired size and surface area. The core particles and shell particles may be made from the same material or different materials. The core particles and/or shell particles may be of a solid, porous, composite, synthetic, and/or natural occurring material. For example, the shell particles and/or core particles may be made from diamond, graphitic carbon, silicon carbide, boron nitride, tungsten carbide, niobium carbide, combinations thereof, or other suitable acid-base-resistant material that is chemically stable in acids and bases over a wide pH range. For example, as an alternative to the aforementioned acid-base-resistant materials, at least a portion of the shell particles may be made from nanographite having a particle size of about 1 μm or less. Examples of other acid-base resistant materials include zirconia, noble metals, acid-base-stable highly cross-linked polymers, titania, alumina, or combinations of the foregoing. As used herein, the term "highly cross-linked polymers" refers to polymers with sufficient cross-linking that prevent swelling of the polymer in the presence of an organic solvent (e.g., prevent greater than 1% swelling or greater than 5% swelling). In one or more embodiments, the cross-linking may be about 1% to about 99%, at least about 70%, about 55% to about 75%, about 75% to about 95%, at least about 85%, at least about 95%, or even at least about 99%. However, in some embodiments using percentages less than about 99%, less than about 95%, or less than 85% may be useful so that the polymer exhibits a sufficient toughness to avoid cracking during use.

The core particles and the shell particles may have the same or different particle sizes. As used herein, the phrase "particle size" means the approximate average particle size, such as average diameter or other average cross-sectional dimension of a plurality of particles, unless otherwise specified. In an embodiment, the shell particles are much smaller than the core particles to achieve a desired composite-particle surface area. In an embodiment, the shell particles have a particle size that is in a range from about 1 nm to 1000 nm, more specifically in a range from about 2 nm to about 500 nm, even more specifically in a range from about 5 nm to about 200 nm, and yet even more specifically in a range from about 10 nm to about 100 nm (e.g., about 10 nm to about 20 nm). The core particles may have a particle size in a range from about 0.5 μm to about 500 μm, more specifically about 1 μm to about 200 μm, or even more specifically in a range from about 1 μm to about 100 μm. The desired particle size of the core particles may depend on the application in which the composite particle is to be used. In one embodiment, the core particles have a particle size in a range from about 0.5 μm to 10 μm, more specifically about 1.5 μm to about 7 μm. This range may be suitable for HPLC applications and the like. In another embodiment, the particle size of the core particles may be in a range from about 5 μm to about 500 μm, or more specifically in a range from about 10 μm to about 150 μm. This larger range may be suitable for solid phase extraction applications and the like.

The acid-base-resistant shell and core particles may have a composition that is selected to be stable in sundry mobile phases, including organic solvents, and chemically harsh acids and bases. Examples of acid-base-resistant materials from which the shell particles and the core particles may be made include, but are not limited to, diamond, graphitic carbon (e.g., graphite), silicon carbide, or another suitable material that is chemically stable in acids and bases over a pH range of at least 3 to 12. For example, diamond, graphite, and silicon carbide are chemically stable in acids and bases over a pH range of about 0 to about 14. Silica and alumina are examples of materials that are not acid-base-resistant materials, because they may significantly degrade in bases with a pH greater than 12. Other relatively acid-base-resistant materials include, but are not limited to, boron nitride and tungsten carbide. Yet other examples of other acid-base-resistant materials include zirconia, noble metals, acid-base stable highly cross-linked polymers, titania, alumina, thoria, or combinations of the foregoing. Further embodiments of acid-base-resistant material may be a polymer that is at least partially cross-linked.

Diamond possesses remarkable chemical inertness, hardness, low compressibility, optical transparency, and high thermal conductivity that may help eliminate thermal gradients in ultra performance liquid chromatography. Unlike silica, diamond does not easily dissolve in aqueous alkaline or acidic media, and it may be used in extremely harsh chemical environments. These properties of diamond may be achieved with naturally occurring diamond and/or synthetic diamond. Diamond material may also include other inorganic carbon materials, such as graphitic carbon, fullerenes, combinations thereof, or other non-diamond carbon.

The acid-base-resistant shell and core particles may be produced through any suitable method, including, for example, by forming carbonaceous material into diamond material under ultra-high pressure and high-temperature conditions or other synthetic diamond particles. Additionally, the acid-base-resistant shell and core particles may be the product of natural processes or by chemical vapor deposition processes. Acid-base-resistant shell and core particles may be produced by crushing and/or grinding a mineral starting material to obtain a desired sized particle. In an embodiment, the acid-base-resistant core particles may comprise micron-sized diamond particles with, for example, a particle size of about 1 µm to about 500 µm (e.g., about 1 µm to about 100 µm) and the acid-base-resistant shell particles may comprise diamond particles, with for example, a particle size of about 1 nm to 1000 nm (e.g., about 2 nm to about 200 nm). The acid-base-resistant shell and core particles may have a spherical shape, a faceted shape, an irregular shape, or other suitable geometry.

In some embodiments, the acid-base-resistant core particles may be substantially non-porous. However, in other embodiments, the acid-base-resistant core particles may be porous.

In one embodiment, the acid-base-resistant shell and/or core particles are selected to be generally spherical. While most, if not all, the particle materials disclosed herein may be made into generally spherical particles, certain materials are more easily produced as generally spherical particles. For example, in one embodiment the acid-base-resistant shell and core particles may be generally spherical, and may comprise graphite, zirconia, titania, noble metals, acid-base-resistant highly cross-linked polymers, acid-base-resistant at least partially cross-linked polymers, alumina, thoria, or combinations of these.

While generally spherical particles may be used as shell particles, generally spherical particles may be more advantageously used as core particles. The use of non-spherical core particles typically has a bigger impact on the back pressure and mobile phase flow profile created by the composite particles compared to non-spherical shell particles and the reproducibility of the porous composite particulate materials. Moreover, since the core particles may be substantially isolated from the mobile phase by the shell particles and polymeric materials, the materials used to make the core particles may be less compatible with the constituents of the mobile phase as compared to the shell particles. Thus, the core particles may more readily be configured to have a generally spherical geometry. In one embodiment, a generally spherical core particle includes a material selected from the group of zirconia, titania, noble metals, acid-base-resistant highly cross-linked polymers, acid-base-resistant at least partially cross-linked polymers, alumina, thoria, or any combination thereof.

In one embodiment, the core particle may be a composite particle of an inner region and a cladding layer surrounding and/or partially or completely encapsulating the inner region. The inner region may include materials that are acid-base unstable and/or incompatible with constituents of a mobile phase. The inner region of the core particle may include a ceramic, polymeric, or metallic material that may be unstable in acids and bases (e.g. silica gel) and/or non-compatible with certain constituents of chromatography mobile phases. In this embodiment, the cladding layer may be made from an acid-base resistant material that gives the core particles acid-base resistant properties and/or compatibility. In one embodiment, the cladding material may be made from any of the acid-base resistant materials disclosed herein, including, but not limited to, diamond, graphitic carbon, tungsten carbide, niobium carbide, boron nitride, zirconia, noble metals, acid-base-stable highly cross-linked polymers, titania, alumina, thoria, and any combinations thereof. In contrast, the materials used in the inner region may be made from any material upon which the cladding layer may be deposited. While not required, the materials used in the inner region may even be acid-base unstable so long as the cladding layer substantially encapsulates the acid-base unstable material.

Core particles including an inner region and a cladding layer may be manufactured by starting with an inner particle made from ceramic, polymeric, or metal upon which the cladding layer is deposited. The inner particle may have an average diameter ranging from about 0.5 µm to about 50 µm, more specifically about 0.75 µm to about 10 µm, or even more specifically about 1 µm to about 5 µm. The cladding layer may be applied as a thin coating. In one embodiment, the cladding layer has a thickness less than 5 µm, more specifically less than 1 µm, even more specifically less than 0.5 µm. The cladding layer may be applied to the inner particle using any technique known in the art, including but not limited to chemical vapor deposition, physical vapor deposition, atomic layer deposition, or another suitable deposition technique.

In another embodiment, the cladding layer may be formed on the inner particle by dipping the inner particles in a carbonizable polymer and then heating the material to form graphitic carbon. Those skilled in the art are familiar with reagents (e.g., resins, polymers, and catalysts) used to make graphitic carbon through pyrolysis and similar methods. To illustrate one example formula, a core particle including the cladding may be made by (i) providing a generally spherical inner particle made from a ceramic, polymer, or metal, (ii) dipping the inner particle in a melt of polymerizable resin such phenol and hexamine (6:1 w/w); (iii) remove excess melt, (iv) heating the coated particles gradually (e.g., to 150° C.) to form the phenol formaldehyde resin around the particles; and (v) carbonizing the resin around the particles by slow heating (e.g., less than 5° C./min) in an oxygen free oven to form a substantially impervious carbonaceous/glassy carbon shell. For example, the resin may be carbonized by heating, such as heating to about 900° C.

In yet another embodiment, the particles may be coated with the polymer by applying a polymeric material while forcing air or other gas up through the particles to suspend the particles. Producing a core particle using an inner particle and a cladding layer is useful for forming generally spherical particles. In one embodiment, the inner region may be manufactured to be spherical and the cladding layer may be applied to the generally spherical inner region to yield a generally spherical core particle.

B. Polymeric Materials

The coating or binding polymer used to bond to the shell particles to the core particle and/or other shell particles may be any polymeric material that may be applied in a coating to adhere the acid-base-resistant particles to one another. For example, the polymer coating may include a polymeric material comprising one or more polymers that provide the porous composite particulate material desired properties for separating components of a mobile phase. The polymer coating may also be stable over the same pH ranges as the acid-base-resistant core and shell particles to provide a chemically resistant polymer coating. The polymer coating may include macromonomers, oligomers, and/or various polymers, without limitation. The polymer coating may include combinations and/or mixtures of different polymeric materials and/or used to form different layers of polymers as described more fully below.

In one embodiment, the polymer coating or binding polymer may include at least one amine group. The amine polymer may be selected to be chemically stable in many of the same mobile phases that diamond particles or other acid-base-resistant materials disclosed herein are stable. In an embodiment, the amine polymer includes at least one pendant amine group and/or at least one primary, secondary, tertiary, and/or quaternary amine group. In various embodiments, the polymer coating may include for example, polyallylamine, polyethylenimine, polylysine, polyvinylamine, chitosan, trimethylchitosan (i.e., quaternized chitosan), polydiallydimethyl ammonium chloride ("PDADMAC"), poly(N,N'-dimethylaminoethylmethacrylate), poly(2-vinylpyridine), poly(4-vinylpyridine), polyvinylimidazole, poly(2-(dimethylamino)ethyl acrylate), and/or poly(2-aminoethyl methacrylate) hydrochloride, combinations of the foregoing, and/or derivatives of the foregoing.

Polyethylenimine may be present in the polymer coating in a wide range of molecular weights and degrees of branching. Chitosan may be produced by the deacetylation of chitin, and chitin may be deacetylated to various degrees. Polymers in the coating may be substantially linear or at least partially branched. Polymers including amines therein may be protonated, deprotonated, or partially protonated prior to, during, and/or following deposition on a surface. Additionally, the polymer coating may comprise any suitable naturally occurring proteins and/or peptides.

In additional embodiments, the polymer coating may include a homopolymer and/or a copolymer compound formed from monomer subunits including, for example, allylamine, vinylamine, ethylenimine, vinyl amine, lysine, arginine, histidine, 2-isocyanatoethyl methacrylate, aziridine, 1-vinylimidazole, 1-vinyl-2-pyrrolidone, 2-vinylpyridine, 4-vinylpyridine, 2-(dimethylamino)ethyl acrylate, 2-aminoethyl methacrylate hydrochloride, and/or 2-(tert-butyl amino)ethyl methacrylate.

Additionally, the polymer coating may include any suitable monomers that may be converted into amines after polymerization by deprotection, hydrolysis, and/or by simple chemical transformation. In various embodiments, the polymer coating may include monomers based on oxazoline, which may be polymerized to form polyoxazolines and/or which may be hydrolyzed. Amine-comprising monomers forming a polymeric compound in coating may be protonated, deprotonated, or partially protonated prior to, during, and/or following polymerization. The amine polymers may also be substantially neutral polymers.

In at least one embodiment, monomers forming a polymer in the polymer coating may be interspersed with other monomer units such as 2-hydroxyethylacrylate, styrene, 1,3-butadiene, methyl methacrylate, methyl acrylate, butyl acrylate, dodecyl methacrylate, acrylonitrile, acrylic acid, methacrylic acid, 4-vinylbenzyl chloride, 4-(trifluoromethyl)styrene, 3-nitrostyrene, vinyl ether, or vinyl acetate.

The polymer coating may include a polymeric compound having various chain lengths and various degrees of branching. For example, the polymeric coating may include a polymeric compound having a weight-average molecular weight or number-average molecular weight ranging from about 1,000 to about 2,500,000. In certain embodiments, the polymer coating may include a polymeric compound having a weight-average molecular weight or number-average molecular weight ranging from about 5,000 to about 100,000. Additionally, the polymer coating may include a polymeric compound having a weight-average molecular weight or number-average molecular weight ranging from about 30,000 to about 60,000 monomer units. In additional embodiments, the polymer coating may include polymeric compounds having a weight-average molecular weight or number-average molecular weight of less than about 1,000. The polymer coating may optionally include oligomers having a chain length of from 2 to 100 monomer units in length. As used herein, the term "polymeric compound" includes oligomers as well as polymers of varying chain lengths and molecular weights, unless otherwise specified.

Additional information about suitable polymers for use in the porous composite particulate materials disclosed herein may also be found in U.S. patent application Ser. No. 12/039,382 filed on 28 Feb. 2008, entitled "Methods For Direct Attachment Of Polymers To Diamond Surfaces And Articles Formed Thereby," naming Matthew R. Linford and Li Yang as inventors, which is hereby incorporated herein, in its entirety, by reference.

In some embodiments, the polymer coating includes one or more anionic polymers. Anionic polymers may be useful for ion exchange chromatography. Example of suitable anionic polymers include, but are not limited to poly(styrenesulfonic acid, sodium salt), poly(acrylic acid), poly(methacrylic acid), derivatives of these, and/or combinations of these. While the polymer coating may be suitable for separating components of a mobile phase, uncoated, exposed surfaces of the core particles and/or shell particles (e.g., diamond core and shell particles) may be functionalized for separating components of a mobile phase as an alternative to or in addition to using the polymer coating.

II. Methods for Making Porous Composite Particulate Materials

Reference is now made to FIG. 1 which illustrates a schematic flow diagram 100 of an embodiment of a method for making a porous composite particulate material from core particles, shell particles, and polymer material. FIG. 1 is a schematic illustration and does not necessarily represent the actual shape or sizes of the acid-base-resistant core particles and/or acid-base-resistant shell particles. Moreover, FIG. 1 illustrates a method for forming a single composite particle, and the porous composite particulate materials disclosed herein include a plurality of such composite particles.

In step 110, a plurality of acid-base-resistant core particles 114 are immersed in a polymeric material that coats and at least partially surrounds each core particle 114 with a respective polymer coating 112. In step 120, a first portion of acid-base-resistant shell particles are adhered to each core particle 114 to form a first porous shell layer 116 of shell particles. The shell particles adhere to the core particles 114 via the polymer coating 112. The thickness and composition of polymer coating 112 may be any thickness that is sufficient so that the shell particles adhere to the core particles 114. The thickness of the polymer coating 112 is typically sufficiently sized so that the polymer does not fill all the voids between adjacent shell particles of the first porous shell layer 116. Maintaining a relatively thin coating may help to provide a desired surface area. In one embodiment, the thickness of the polymer coating 112 may be about 0.1 nm to about 1 μm thick, about 1 nm to about 1 μm, or about 5 nm to about 100 nm. In an embodiment, the thickness of the polymer coating is less than the average diameter of the shell particles, more specifically the thickness is less than about half the diameter of the shell particles, and even more specifically less than one-fourth the diameter of the shell particles. The polymer coating 112 may be cured or otherwise chemically modified in step 120 or in subsequent steps, as described more fully below.

In one embodiment, more than one layer of shell particles may be deposited at a time on the core particle. The number of layers typically depends on the size of the particle and the desired thickness of the previous polymer layer.

The portion of shell particles may be applied to each core particle 114 by suspending the shell particles in a solvent and immersing the coated core particles 114 in the suspension of shell particles or, alternatively, the suspension of shell particles may be caused to flow over the core particles 114. Any solvent suitable for suspending the core particles and/or the shell particles may be used. In one embodiment, the core particles and/or the shell particles may be suspended in water. The coating of shell particles on the coated core particles 114 yields intermediate composite particles 128 having rough surfaces. The rough surface includes voids (i.e., recesses in the surface) between the individual shell particles of the first porous shell layer 116.

A plurality of the intermediate composite particles 128 may be used as a final product if desired and/or cross-linked to improve mechanical stability. However, substantially increased surface area may be achieved by repeating steps 110 and 120 to yield intermediate composite particles with increasing numbers of porous shell layers. As shown in step 130, a polymer coating 113 may be applied to the surface of the intermediate composite particle 128 to coat the shell particles of the first porous shell layer 116. The polymer coating 113 may be made from the same or a different polymeric material than the polymeric coating 112 used in step 110.

The thickness of the polymer coating 113 is typically sufficiently sized so that the polymer does not fill all the voids between adjacent shell particles of the first porous shell layer 116. In step 140, a second portion of the shell particles may be applied to intermediate composite particle 138 to yield second intermediate composite particles 142 each having a second porous shell layer 144 of shell particles bonded to the first porous shell layer 116.

In step 150, yet a third polymer coating 115 may be coated on intermediate composite particle 144 to yield intermediate particles 152, with the shell particles of the second porous shell layer 144 being coated. The polymer coating 115 may be made from the same or a different polymeric material than the polymeric coatings 112 or 113 used in steps 110 or 130. The thickness of the polymer coating 115 is typically sufficiently sized so that the polymer does not fill all the voids between adjacent shell particles of the second porous shell layer 144.

In step 160, a third portion of shell particles may be adhered to the second porous shell layer 144 of intermediate particles 152 to yield intermediate composite particles 164 having a third porous shell layer 162 of shell particles.

The porous shell layers 116, 144, and 162 may have differently or similarly sized shell particles. Also, the shell particles in the different layers may have a different composition and/or be bonded using different compositions of polymer. The different shell particles, core particles, and polymers may be selected from any combination of the components described herein or components known in the art that are similar and/or provide similar function.

The method of adding additional porous shell layers may be continued until a desired number of porous shell layers and/or a desired surface area is achieved for the composite particles. In one embodiment, the method of forming porous shell layers may be repeated at least 5 times, more specifically at least about 10 times, or even more specifically at least 20 times to yield composite particles having 5, 10, or 20 porous shell layers, respectively. This method continues until the desired number of porous shell layers is achieved. In one embodiment, the number of porous shell layers is at least about 3, more specifically at least about 5, even more specifically at least about 10, yet even more specifically at least 20, and most specifically at least 50.

The shell particles, core particles, and/or composite particles may each be completely or partially coated with the polymer coating. In many cases, the polymer coating is applied using immersion, which tends to apply a relatively even coating around an entire particle. However, in some embodiments, one or more of the acid-base-resistant particles may only be partially coated with a sufficient polymer coating to adhere to other particles. In addition, the application of the shell particles may be asymmetric so as to create asymmetric composite particles.

Once the polymer has been attached to the surface of the core particles, there are numerous chemical reactions that may be performed, including cross-linking and curing. The cross-linking and/or curing may be carried out separately at any of the steps described in method 100. In one embodiment, curing may be performed for each step that results in the formation of a porous shell layer. In one embodiment, cross-linking is carried out as a final step 170. However, the step 170 is optional and embodiments also include the use of polymers that do not require curing and/or cross-linking.

In embodiments where curing and/or cross-linking is performed, the polymer coating may be cured and/or cross linked using any suitable technique such as thermal curing and/or radiation curing such as curing using infrared or ultraviolet curing lights. Curing may increase the physical and/or chemical stability of the polymer coating. For example, curing may increase the stability of the polymer coating when exposed to harsh conditions, such as high and/or low pH solutions, which may allow a stationary phase including the porous composite particulate material to be cleaned and/or otherwise used under harsh conditions. Some porous composite particulate materials described herein may be used in combination with strong solvents, high pH conditions, and/or low pH conditions. The ability to clean a column under harsh conditions may enable reuse of a previously contaminated stationary phase. In at least one embodiment, curing may cause amide linkage to form between various compounds in the polymer coating. Additionally, curing may cause amide or other linkages to form between various chemical moieties in the polymer coating and the surface of the acid-base-resistant particles.

In additional embodiments, a polymer in the coating may be allowed to react with another compound in the coating before, during, and/or after depositing the coating on the acid-base-resistant particles to increase the molecular weight of the coating. Increasing the molecular weight of the polymer may be advantageous in that the higher molecular weight coating may have increased stability in a variety of conditions.

Surprisingly, in one embodiment, the polymeric material may be applied to the core particles and/or the shell particles as a neutral polymer. The neutral polymers are able to encapsulate and hold the particles together without ionic interactions between the polymer and the particles. However, in some embodiments, a neutral polymer, such as PAAm, may bind through ionic interactions.

In additional embodiments, the coating and/or at least a polymeric compound forming the coating may be cross-linked during a curing process, such as a thermal and/or pressure-induced curing process, as described above. Additionally, the curing of the coating and/or at least a polymeric compound forming the coating, may be cross linked by exposing the coating to radiation. Cross-linking may cause stable bonds to form with amine groups and/or other chemical moieties in a polymeric compound in the coating, thereby increasing the stability of coating. Additionally, cross-linking compounds in the coating using compounds having epoxy groups may produce hydroxyl groups in and/or on the coating, resulting in a change in chemical characteristics of the coating and providing potential reactive sites on the coating. In one embodiment, the cross-linking produces a carbon-nitrogen bond, which has been found to work well for bonding together the relatively inert core and shell particles of the composite materials disclosed herein.

In certain embodiments, a cross-linking agent having at least two functional bonding sites may be used to effect cross-linking of at least a portion of the coating and/or at least a polymeric compound forming the coating. For example, a cross-linking agent may comprise a diepoxide compound having at least two epoxide groups, each of which may bond with an amine group. A cross-linking agent having at least two functional bonding sites may bond with at least one amine group on at least two or more polymeric molecules and/or compounds. In an additional embodiment, a cross-linking agent having at least two functional bonding sites may bond with at least one amine group on at least two separate sites on a single polymeric molecule. Additionally, a cross-linking agent having at least two functional bonding sites may bind to a polymeric compound forming the coating at only one of the at least two functional binding sites.

Examples of cross-linking agents suitable for cross-linking the polymer coating and/or at least a polymeric compound forming the polymer coating may include any type of compound containing two or more amine reactive functional groups, including, for example, diisocyanates, diisothiocyanates, dihalides, diglycidyl ethers, diepoxides, dianhydrides, dialdehydes, diacrylates, dimethacrylates, dimethylesters, di- and/or triacrylates, di- and/or trimethacrylates, and/or other diesters. In at least one embodiment, acrylates and/or methacrylates may react with an amine by Michael addition.

In addition, suitable cross-linking agents may include, without limitation, 1,2,5,6-diepoxycyclooctane, phenylene-diisothiocyanate, 1,4-diisocyanatobutane, 1,3-phenylene diisocyanate, 1,6-diisocyanatohexane, isophorone diisocyanate, diethylene glycol diglycidyl ether, 1,4-butanediol diglycidyl ether, bisphenol A diglycidyl ether, poly(ethylene glycol) diglycidyl ether, polypropylene glycol) diglycidyl ether, octanedioic acid dichloride (suberic acid dichloride), phthaloyl dichloride, pyromellitic dianhydride, 1,3-butadiene diepoxide, p-phenylene diisothiocyanate, 1,4-dibromobutane, 1,6-diiodohexane, glutaraldehyde, 1,3-butanediol diacrylate, pentaerythritol triacrylate, pentaerythritol tetraacrylate, dipentaerythritol pentaacrylate, 1,6-hexanediol dimethacrylate, and/or propoxylated (3) glyceryl triacrylate. Cross-linking agents may additionally comprise at least one functional group suitable for bonding with non-amine functional groups that may be present on polymers in the coating disclosed herein. The cross-linking agents may also include two or more functional groups, which may be the same or different. For example, the cross-linking agent may include molecules that have an acrylate and a methacrylate group, or a glycidyl group and a methacrylate group.

Generally, the polymer coating may be at least partially cross-linked. In one embodiment, the cross-linking exhibited by the polymer coating may be about 1% to about 99%, at least about 70%, about 55% to about 75%, about 75% to about 95%, at least about 85%, at least about 95%, or even at least about 99%. However, in some embodiments, the cross-linking may be less than about 99%, less than about 95%, or less than 85%, which may be useful so that the polymer coating exhibits a sufficient toughness to avoid cracking during use and/or handling. In some embodiments the crosslinking may be in a range from 1%-99%.

In at least one embodiment, an epoxide compound such as, 1,2,5,6-diepoxycyclooctane, may have at least one highly strained epoxide ring that may be reactive with various amine groups in the polymer coating. Various alcohols may be used as effective solvents for amine-epoxide reactions. Reaction of the at least one highly strained epoxide ring with an amine group in the coating may result in immobilization of hydrophobic cyclooctyl rings and hydrophilic hydroxyl groups in the coating, leading to the formation of a mixed-mode stationary phase in the coating. This type of mixed-mode stationary phase may be employed for various uses, including, for example, retention of proteins and small molecules such as drugs under reverse phase and/or normal conditions in an SPE column.

The amine group is an extremely versatile chemical reagent with a rich chemistry. Information about some of these reactions may be found in U.S. patent application Ser. No. 12/040,638 filed on 29 Feb. 2008, entitled, "Functionalized Diamond Particles And Methods For Preparing The Same," naming Matthew R. Linford and Gaurav Saini as inventors, which is hereby incorporated herein, in its entirety, by this reference.

FIG. 2 describes another embodiment of a method 200 in which all or a portion of the acid-base-resistant shell particles are coated with polymer material prior to being adhered to the core particles or to each other (e.g., in a layer-by-layer process described above). In method 200, step 210 includes applying a polymer coating to acid-base-resistant shell particles to yield coated particles 214. In step 220, acid-base-resistant core particles 222 are mixed with the shell particles 212 using any suitable mixing process. The polymer coating on the coated shell particles 214 bonds the shell particles 212 to the core particles 222 to yield an intermediate composite particle 224. Additional layers of shell particles may be bonded to intermediate composite particle 224 by adding a second portion of coated shell particles 214 or alternatively by coating the composite particles 224 with polymer material and shell particles as described in steps 110 and 120. The method 200 may also include additional curing and/or cross-linking steps as described above with regard to the method 100.

In one embodiment, the porous composite particulate material may include a body of bonded composite particles.

The body may be formed by forming a bed of coated intermediate composite particles (e.g., composite particles 224) and polymerizing or otherwise joining the individual composite particles together to form a coherent body. Forming a body of bonded composite particles may allow the individual particles to maintain their integrity.

In other embodiments, some of the core particles may be coated with polymer material and some of the core particles may be uncoated. Also some of the shell particles may be coated with polymer material and some of the shell particles may be uncoated. In such an embodiment, the coated/uncoated core particles may be mixed together with the coated/uncoated shell particles to form a plurality of composite particles.

FIG. 3 describes a method for forming a body of bonded composite particles in vessel according to another embodiment. In this embodiment, a vessel 302 is provided that includes an inlet 304 and an outlet 306. A plurality of core particles are positioned within the vessel 302 to form a particle bed 308. The core particles may be retained in the vessel by a frit 310. In a first step, the vessel 302 is at least partially filled to form the bed 308. In a second step, the particles in the bed 308 are at least partially coated with a layer of polymer. In a third step, a suspension of shell particles is caused to flow through the bed 308, such as through voids between adjacent core particles. The shell particles bond to the core particles through the layer of polymer. Additional porous shell layers may be added as described above with regard to FIGS. 1 and 2. The body may be formed by curing and/or cross-linking the intermediate composite particles so-formed while packed in the vessel as a bed. The bonded composite particles have improved structural integrity, which may help prevent shell particles from being freed during use of the porous composite particulate material in chromatography.

III. Porous Composite Particulate Materials

The porous composite particulate materials described herein provide desired sizes, porosity, surface areas, and chemical stability suitable for chromatography and SPE techniques. When used in chromatography and SPE, high-resolution separation may be achieved with relatively low back pressure, The porous composite particulate materials include a plurality of composite particles, with each composite particle including a core particle at least partially surrounded by one or more layers of shell particles. The shell particles are bonded to the core particles by a polymer coating. The shell particles and/or core particles may be made from the acid-base-resistant materials described above, including but not limited to diamond particles, graphitic carbon, silicon carbide, boron nitride, tungsten carbide, niobium carbide, a binderless carbide (e.g., binderless tungsten carbide), and combinations thereof. Examples of other acid-base-resistant materials include zirconia, noble metals, acid-base stable highly cross-linked polymers, titania, alumina, thoria or combinations of the foregoing. The porous composite particulate material may also have any combination of polymers described above. However, in an embodiment, the polymer coating that bonds the core particles to the shell particles and/or the shell particles to themselves is an amine polymer.

The composite particles may be provided in the form of finely divided discrete particles (e.g., a powder). Alternatively, the composite particles may be provided as a body of bonded composite particles. When the composite particles are provides as a body of bonded composite particles, the body may exhibit dimensions suitable for use in a separation apparatus, such as, but not limited to, separation devices used in HPLC.

In one embodiment, the composite particles have a particle size in a range from about 0.5 (or lower) μm to 500 μm, more specifically about 1 μm to 200 μm, or even more specifically in a range from about 1 μm to about 150 μm. In one embodiment, the composite particles have a particle size in a range from about 1 μm to about 10 μm, or more specifically about 1.5 μm to about 7 μm. This particle range may be particularly useful for HPLC applications and the like. In another embodiment, the composite particles can have a particle size can be in a range from about 5 μm to about 500 μm, or more specifically in a range from about 10 μm to about 150 μm. This larger particle range may be more suitable for use in solid phase extraction applications and the like.

The composite particles may include a desired surface area. The surface area may depend on core and shell particle size, number of porous shell layers, and particle geometry. However, the surface area of the composite particles is higher than a similarly sized core particle due to the additional surface area provided by the shell particles. In an embodiment, the surface area may be measured using the Brunauer Emmett and Teller ("BET") technique and is in a range from 1-500 $m^2/g$ for composite particles having a particle size in a range from about 1 μm to 500 μm, more specifically in a range from 25-300 $m^2/g$, or even more specifically 50-200 $m^2/g$. In one embodiment, the composite particles have a particle size in a range from about 0.5 μm to 10 μm may have a surface area in a range from about 10-500 $m^2/g$, more specifically in a range from 25-200 $m^2/g$, and even more specifically in a range from 25-60 $m^2/g$. In another embodiment, composite particles having a particle size of at least about 0.5 μm (e.g., about 10 μm to 250 μm) may have a surface area of at least about 5 $m^2/g$ (e.g., about 5-200 $m^2/g$, more specifically about 10-100 $m^2/g$, or even more specifically about 50-150 $m^2/g$). In yet another embodiment, composite particles having a particle size in a range from about 250 μm to about 500 μm may have a surface area at least about 5 $m^2/g$, and even more specifically at least about 10 $m^2/g$ for composite particles with a particle size in a range from about 250 μm to about 500 μm.

In a more detailed embodiment, a composite particle including a diamond core particle having a size of about 2.5 μm to about 5 μm and 1-50 porous shell layers of diamond shell particles having a particle size of about 5 nm to about 50 nm may have a surface area of about 1 $m^2/g$ to about 60 $m^2/g$. In a more specific embodiment, a composite particle including a diamond core particle having a size of about 2.5 μm and 10-50 porous shell layers of diamond shell particles having a particle size of about 5 nm to about 10 nm may have a surface area of about 14 $m^2/g$ to about 60 $m^2/g$. In another more specific embodiment, a composite particle including a diamond core particle having a size of about 5 μm and 10-50 porous shell layers of diamond shell particles having a particle size of about 5 nm to about 10 nm may have a surface area of about 7 $m^2/g$ to about 33 $m^2/g$.

FIG. 4 illustrates a composite particle that includes at least a bilayer of polymer according to another embodiment. A bilayer of polymer may be constructed from a first polymer coating 402 on an acid-base-resistant core particle 404. The polymer coating 402 may be formed using steps 110 and 120 as described above. A bilayer is formed by adding a functional polymer layer 406 and a second polymer coating layer 408. The polymer layers 402 and 408 are binding layers selected for bonding the shell particles to the core particles and/or the shell particles to the shell particles. The functional layer 406 is a polymeric layer that imparts a desired functionality to the composite particle. The polymers that are used to make the functional layer 406 may be selected from the polymers mentioned above that are useful for forming layers 402 and 408. However, the formation of a bilayer allows the selection of two or more different polymers to form the composite thereby allowing the different polymer layers to be optimized for different purposes. Typically, the layers 402 and 408 are selected for bonding polymers together and the functional polymer layer 406 is selected for providing a separate function such as, but not limited to properties related to separation efficiency. In one embodiment, the functional polymer layer 406 may be an anionic polymer.

In some embodiments, an additional particulate component may be embedded in the porous shell layers of the shell particles. The additional particulate component may be any organic or inorganic material that provides a desired property to the porous composite particulate material. In one embodiment, the additional component may be initially included in the manufacture of the composite particles but then removed. For example, the porous shell layers may include silica particles that exhibit a selectivity to be removed over more acid-base-resistant particles, such as diamond, graphite, or boron nitride shell particles. This method may allow a composite particle to be formed with particular structural features. Alternatively, the additional component may be included with the purpose of removing or eluding out the component during use. For example, the additional component may be configured to elute out over time in the presence of a mobile phase.

In one embodiment, the additional component may be a particle that has affinity for a drug or other chemical reagent. In one embodiment, the additional component may include a catalytic reagent. The additional component may be included in the core particles and/or the layers of shell particles.

IV. Separation Apparatuses and Methods

Figure 5:
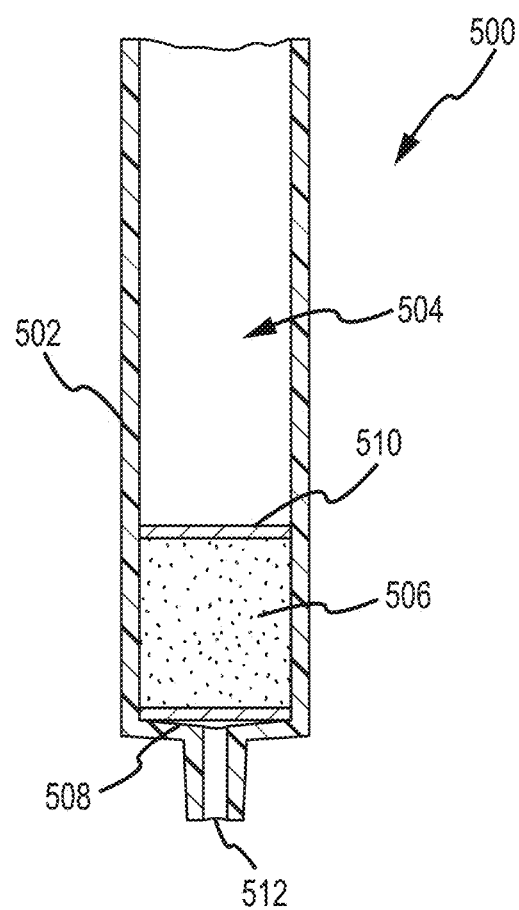
FIG. 5 is a cross-sectional view an embodiment of a separation apparatus including a porous body comprising any of the porous composite particulate materials disclosed herein.

FIG. 5 is a cross-sectional view of a separation apparatus 500 according to an embodiment. The separation apparatus 500 may include a column 502 defining a reservoir 504. A porous body 506 (e.g., a porous composite bed, porous disk, other porous mass, etc.) may be disposed within at least a portion of the reservoir 504 of the column 502. The porous body 506 may comprise any of the porous composite particulate materials disclosed herein in bonded or powder form. The porous body 506 is porous so that a mobile phase may flow therethrough. In various embodiments, a frit 508 and/or a frit 510 may be disposed in column 502 on either side of porous body 506. The frits 508 and 510 may comprise any suitable material that allows passage of a mobile phase and any solutes present in the mobile phase, while preventing passage of the composite particulate material present in porous body 506. Examples of materials used to form the frits 508 and 510 include, without limitation, glass, polypropylene, polyethylene, stainless steel, titanium, and/or polytetrafluoroethylene.

The column 502 may comprise any type of column or other device suitable for use in separation processes such as chromatography and solid phase extraction processes. Examples of the column 502 include, without limitation, chromatographic and solid phase extraction columns, tubes, syringes, cartridges (e.g., in-line cartridges), and plate containing multiple extraction wells (e.g., 96-well plates). The reservoir 504 may be defined within an interior portion of the column 502. The reservoir 504 may permit passage of various materials, including various solutions and solvents used in chromatographic and solid-phase extraction processes.

The porous body 506 may be disposed within at least a portion of reservoir 504 of the column 502 so that various solutions and solvents introduced into the column 502 contact at least a portion of the porous body 506. The porous body 506 may comprise a plurality of substantially non-porous particles in addition to the composite porous material.

In certain embodiments, frits, such as glass frits, may be positioned within the reservoir 504 to hold porous body 506 in place, while allowing passage of various materials such as solutions and solvents. In some embodiments, a frit may not be necessary, such as the body of bonded-together composite particles as described above with reference to FIG. 4.

In one embodiment, the separation apparatus 500 is used to separate two or more components in a mobile phase by causing the mobile phase to flow through the porous body 506. The mobile phase is introduced through an inlet and cause to flow through the porous body 506 and the separated components may be recovered from the outlet 512.

In one embodiment, the mobile phase includes concentrated organic solvents, buffers, acids, or bases. In one embodiment, the mobile phase includes a concentrated acid with a pH less than about 3, more specifically less than about 2. In another embodiment, the mobile phase includes a base with a pH greater than about 9, more specifically greater than about 11, and even more particularly greater than 12.

In one embodiment, the separation apparatus 500 is washed between a plurality of different runs where samples of mixed components are separated. In one embodiment, the washing may be performed with water. In another embodiment, a harsh cleaning solvent is used. In this embodiment, the harsh cleaning solvent may be a concentrated organic solvent and/or a strong acid or base. In one embodiment, the cleaning solvent has a pH less than about 3, more specifically less than about 2. In another embodiment, the cleaning solvent has a pH greater than about 10, more specifically greater than about 12, and even more particularly greater than 13.

V. Examples

The following examples are for illustrative purposes only and are not meant to be limiting with regards to the scope of the specification or the appended claims. For example, the present disclosure and claims are not limited to the use of diamond particles, unless otherwise specified.

Example 1

Synthesis of Composite Diamond Particles

Example 1 describes the synthesis of core-shell composite particles using an amine polymer, micron-sized core diamond particles, and nano-sized shell diamond particles.

The following reagents were provided: Poly(allylamine) ($M_w$ ca. 65,000, 20 wt. % solution in water, Aldrich, Milwaukee, Wis.), polyethylenimine (Mw 25,000, Aldrich, Milwaukee, Wis.) (1,2,5,6-diepoxycyclooctane (96%, Aldrich) and 1,16-hexadecanedioic acid (≥98%, Aldrich) were used as received. Diamond powders (50-70 μm and 100-250 nm) were provided by U.S. Synthetic Corporation of Orem, Utah.

Core-shell particles were synthesized from 50-70 μm core particles and 100-250 nm shell diamond particles. The microdiamond core particles were cleaned in piranha solution (70% $H_2SO_4$:30% conc. $H_2O_2$) at 100° C. for 1 h.

The piranha cleaned diamonds were then sonicated in ultrapure water, and washed extensively with ultrapure water on a filter funnel. The nanodiamond shell particles were not cleaned in piranha solution, but used as received.

Core-shell composite particles containing 0-5 and 9 bilayers of PAAm-nanodiamond were synthesized. A 0.25 wt. % solution of poly(allylamine) was made from 1.55 g of PAAm (20 wt. % solution in water) in 125 mL of ultrapure water, and 12 g of piranha-cleaned microdiamond powder were poured into this solution. The solution was shaken for ca. 10 s every 10 min for 1 h to expose the particles to PAAm. After immersion in the PAAm solution, the microdiamond powder was washed extensively with ultrapure water on a filter funnel. An aqueous suspension of nanodiamond powder was prepared by sonicating 1 g of nanodiamond shell particles in 120 mL of ultrapure water, and 12 g of PAAm-functionalized microdiamond powder was poured into this suspension for 1 h. This suspension of nanodiamond and PAAm-functionalized diamond was shaken gently for ca. 10 s every 10 min to expose all surfaces of the PAAm-functionalized microdiamond particles to nanodiamond particles (i.e., shell particles). After adsorption, the aqueous suspension was filtered on a medium pore size (25 µm-50 µm) filter funnel. As the size of the nanodiamond particles is much smaller than the pore size of the filter funnel, unbounded nanodiamond particles in the suspension easily pass through the pores of the filter funnel leaving behind microdiamonds containing one layer of adsorbed nanodiamond particles. These particles were washed extensively with ultrapure water on the filter funnel to remove any non-adsorbed nanodiamonds. Approximately 2.8 g of core-shell composite particles (having microdiamonds containing one layer of adsorbed nanodiamond particles) were taken from this lot for characterization.

Examples 2-4

Synthesis of Multi-Layered Diamond Composite Particles

The remaining composite particles from Example 1 were used as an intermediate composite particle to make composite particles having a plurality of layers of shell particles. The intermediate composite particles were poured into the aqueous solution of PAAm described in Example 1. The intermediate composite particles were held for 1 h to amine functionalize the outer surface of the first layer of shell particles. Treatment with the PAAm solution and the cleaning procedure were repeated as in Example 1 (vide supra). A powder was recovered and poured into an aqueous suspension of nanodiamonds. The deposition conditions were as for the earlier layer (vide supra). Another 2.8 g of this functionalized diamond powder were taken, and the remaining diamond powder was treated in the same way. This procedure of immersion in the aqueous solution of PAAm followed by immersion in the aqueous suspension of nanodiamond was performed 3, 5, and 9 times to achieve a composite particle with the desired number of layers of nanodiamond particles for Examples, 2-4, respectively. A flow diagram of the synthesis of the composite particles of Examples 2-4 is illustrated in FIG. 1, where the polymer coating used is PAAm and the acid-base-resistant core particles and acid-base-resistant shell particles each include diamond.

Example 5

Synthesis of Bonded Diamond Composite Particles

Example 5 describes the synthesis of core-shell composite particles that are bonded together. Bonded core-shell composite particles have been found to be particularly useful in HPLC. Core-shell particles were prepared from 5 µm and 10-50 nm diamond particles. Nanodiamond particles were used as their aqueous suspension (8.17 wt. %), which had a surfactant in it. The addition of surfactant prevented the agglomeration of nanodiamond particles. Unlike the preparation for core-shell composite particles for SPE (i.e., described in Example 1), the particles in Example 5 were prepared in a test tube. Approximately 1.6 g of 5 µm diamond powder was poured into ca. 30 ml water in a test tube. A 1.33 wt. % solution of polyethylenimine ("PEI") was made in water, and 400 µA of this solution was added into the test tube. The test tube was shaken vigorously for 3 min to expose diamond particles to the polymer. After treatment with PEI solution, the solution was centrifuged for 1 min at 5000 rpm. As a result of that the centrifuging, diamond particles settled down at the bottom of the test tube. The supernatant was discarded, and more water was added to the test tube. The test tube was shaken vigorously to remove non-specifically adsorbed polymer from the surface, and centrifuged afterwards. This cleaning procedure was repeated two times. After cleaning, 400 µl of nanodiamond suspension was added to 30 ml suspension of PEI coated 5 µm diamond particles in the test tube, and the test tube was shaken vigorously for 3 minutes. After treatment with nanodiamond particles, the microdiamond particles were washed with copious amounts of water using the same procedure as for PEI treated particles mentioned before. The alternate treatment with PEI and nanodiamond was continued until 20 bilayers of nanodiamond and PEI were formed on the surface of the 5 µm diamond particles.

Examples 6-9

Chemical Cross-Linking of Composite Particles

Examples 6-9 describes a method of improving the mechanical stability of core-shell composite particles by cross-linking the polymer of adjacent particles. Nanodiamond particles, microdiamond particles and adsorbed PAAm are attached to themselves through relatively weak non-covalent interactions. The mechanical stability of these particles was improved by chemical cross-linking with 1,2,5,6-diepoxycyclooctane.

In Examples 6-8, chemical cross-linking was carried out on the composite particles of Examples 2-4 respectively. The cross-linking was carried out as a final step in the synthesis of the core-shell particles. In each of Examples 6-8, a 2.3 wt. % solution of 1,2,5,6-diepoxycyclooctane (made by dissolving 0.1747 g in 7.5 mL isopropanol) was used to chemically cross-link the PAAm-nanodiamond of the core-shell composite particles of Examples 1-4, respectively. Approximately 2.6 g of each different core-shell particle was used for chemical cross-linking. The reaction was done in a sealed thick-walled glass tube at 80° C. overnight. After the reaction, the core-shell diamond powder was washed extensively in the filter funnel with copious amounts of isopropanol followed by dichloromethane.

FTIR based surface analysis of Examples 6-8 was performed with a Magna-IR 560 spectrometer from Nicolet (Madison, Wis.). Environmental scanning electron microscopy ("ESEM") images of the samples were acquired using a FEI (Philips) XL30 ESEM FEG instrument. Since diamond is an insulator, the diamond powder was adhered to a conductive, double stick carbon tape, and the instrument was operated in low-vacuum mode to prevent the charging of the surface. Samples were sent to Micromeritics (Norcross, Ga.) for BET surface area and pore size analysis.

The layer-by-layer deposition of nanodiamond particles around a solid microdiamond core was monitored by four techniques: diffuse reflectance infrared Fourier transform spectroscopy ("DRIFT"), ESEM, BET surface-area measurements, and sorbent (analyte) capacity measurements.

Figure 6A:
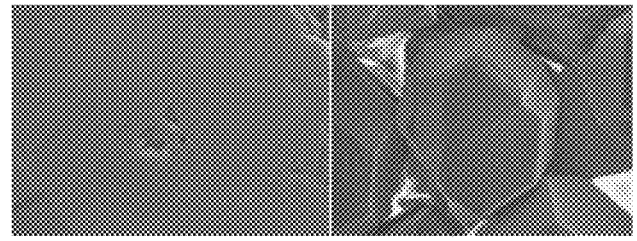
FIGS. 6A-6D are environmental scanning electron microscopy images of diamond particles with no shell diamond particles bonded thereto and the composite particles of Examples 6-8, respectively.
Figure 6B:
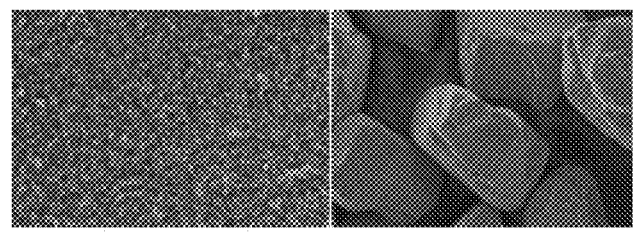
Figure 6C:
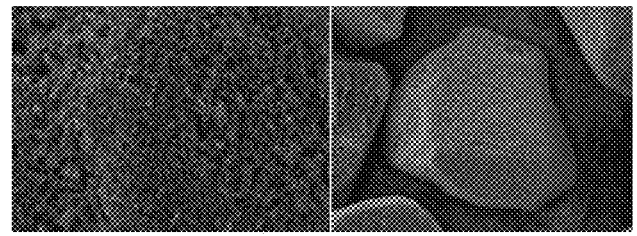
Figure 6D:
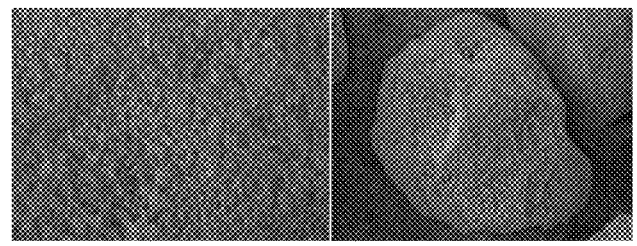
Figure 7A:
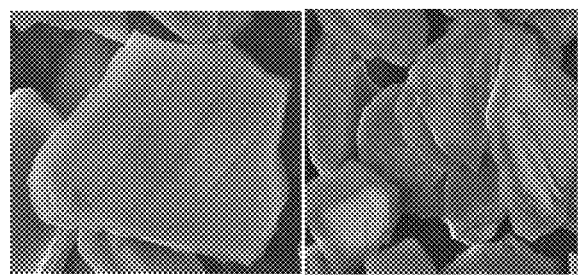
FIGS. 7A and 7B are environmental scanning electron microscopy images of composite particles.
Figure 7B:

Referring to FIGS. 6A-6B, ESEM images of a control sample and Examples 6-8 are shown. Images of Examples 6-8 are shown in FIGS. 6B-6D, respectively. The images in FIG. 6A shows core diamond particles with no shell diamond particles (i.e. control particles). It is clear from the ESEM images that PAAm-functionalized, nanodiamond particles start adsorbing on the surface of microdiamonds after their first immersion in aqueous suspension of nanodiamonds. It is observed that with an increase in the number of nanodiamond layers, the surface becomes fuzzier in appearance. FIG. 7A shows an ESEM image of a core diamond having no shell diamonds and FIG. 7B shows an ESEM image of 5 µm diamond particles that have 20 bilayers of PEI nanodiamond. The high surface area is clearly identifiable by the fuzzy texture on the particle surface for the particles with 20 bilayers.

Figure 8A:
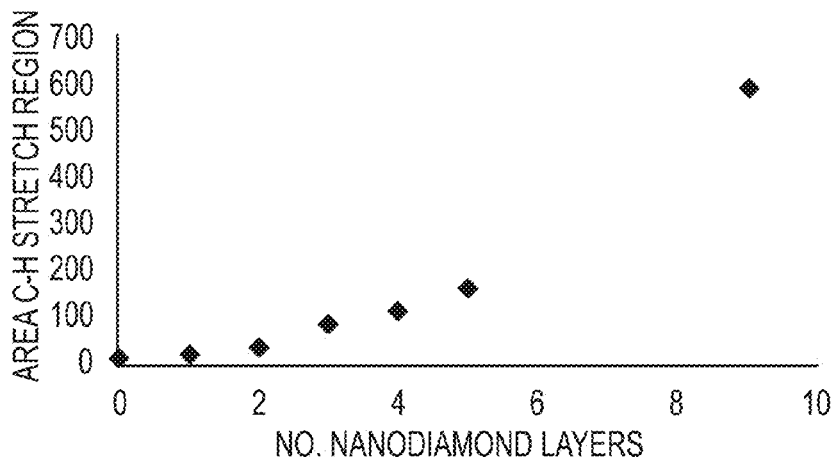
FIGS. 8A-8C are graphs of area C-H stretch region, Brunauer Emmett and Teller surface-area measurements, and capacity as a function of number of shell layers, respectively.
Figure 8B:
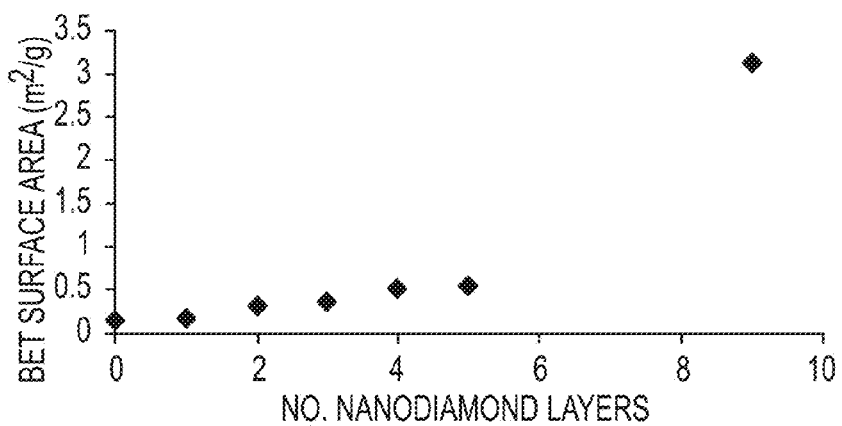
Figure 8C:
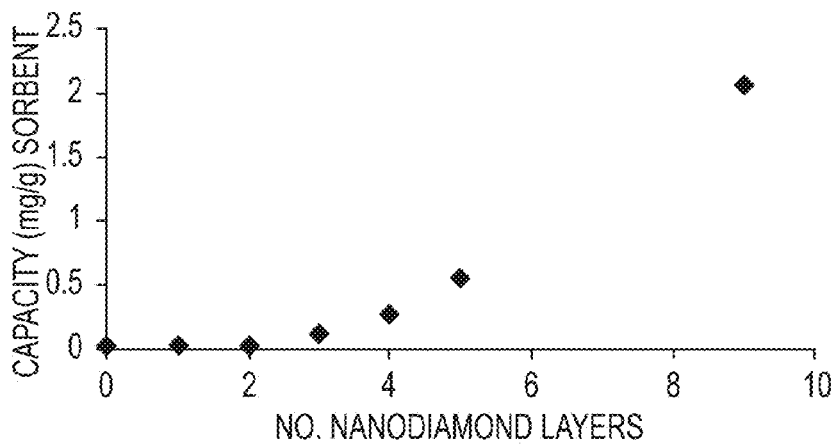

Core-shell composite particles were also characterized according to their number of shell layers. FIGS. 8A-8C are plots of the area C-H stretch region, the BET surface area ($m^2$/g), and sorbent capacity (mg/g) for a given number of shell layers, respectively. Referring to FIG. 8A, DRIFT was used to measure the area of the C-H stretching region of the core-shell composite particles as a function of the number of PAAm-nanodiamond bilayers. It is evident that the area of the C-H stretching region increases with an increase in the number of PAAm-nanodiamond bilayers. Clearly, with an increase in the number of nanodiamond layers, the amount of the adsorbed polymer also increases, which leads to an increase in the number of $CH_2$ groups, and IR adsorption.

Referring to FIG. 8B, one important feature is the increase in surface area that may be achieved with increasing number of layers. The plot of the BET surface area of the composite particles shows a clear increase in surface area with increasing number of PAAm-nanodiamond bilayers. With an increase in number of nanodiamond layers, the structure becomes more porous. The average pore size of the core shell particles containing 9 layers of nanodiamond particles was also determined to be 134 Å by the BET method.

As a characterization tool, the SPE capacity of the core-shell composite particles was also determined. FIG. 8C shows a plot of the capacity of the core-shell particles vs. the number of nanodiamond layers. The capacity increases substantially with an increase in the surface area for core-shell composite particles containing greater than 5 or greater than 10 layers of nanodiamond particles, ca. 80-fold increase in capacity was observed 9 layers compared to solid non-porous cross-linked diamond powder.

The Examples demonstrate the effect of layer-by-layer deposition of nanodiamond particles on various parameters, i.e., surface area, capacity, IR adsorption, etc., was determined. Core-shell diamond particles have a higher surface area and capacity than solid diamond particles, which increases with the number of PAAm-nanodiamond bilayers.

While various aspects and embodiments have been disclosed herein, other aspects and embodiments are contemplated. The various aspects and embodiments disclosed herein are for purposes of illustration and are not intended to be limiting. Additionally, the words "including," "having," and variants thereof (e.g., "includes" and "has") as used herein, including the claims, shall have the same meaning as the word "comprising" and variants thereof (e.g., "comprise" and "comprises").

What is claimed is:

1. A method for manufacturing a porous composite particulate material, comprising:
   providing a plurality of acid-base-resistant core particles and a plurality of acid-base-resistant shell particles, wherein the plurality of acid-base-resistant shell particles include diamond particles;
   coating at least a portion of the plurality of acid-base-resistant core particles, at least a portion of the plurality of acid-base-resistant shell particles, or combinations thereof with a polymer material including at least one amine polymer;
   adhering a respective portion of the plurality of acid-base-resistant shell particles at least partially about each of the plurality of acid-base-resistant core particles to form a plurality of porous shell layers, each of the plurality of porous shell layers being bonded to an adjacent one of the plurality of porous shell layers by a respective layer of the polymer material to form a plurality of composite particles; and
   at least partially cross-linking the polymeric material to exhibit about 1% to about 99% cross-linking.

2. The method as in claim 1, wherein the polymeric material comprises a substantially neutral polymer.

3. The method as in claim 1, wherein the cross-linking produces a covalent carbon-nitrogen bond.

4. The method as in claim 1, wherein the cross-linking is carried out using a cross-linking agent including two or more functional groups, wherein at least one of the functional groups is selected from the group consisting of an isocyanate, an epoxide, an alkyl halide, or an acid halide.

5. The method as in claim 1, wherein cross-linking the polymeric material exhibits less than 85% cross-linking.

6. The method as in claim 1, wherein at least a portion of the plurality of acid-base-resistant core particles and/or at least a portion of the plurality of acid-base-resistant shell particles comprises at least one member selected from the group consisting of diamond, graphitic carbon, silicon carbide, boron nitride, tungsten carbide, niobium carbide, zirconia, noble metals, acid-base-stable highly cross-linked polymers, titania, alumina, thoria and combinations thereof.

7. The method as in claim 1, wherein at least a portion of the acid-base-resistant core particles comprises an inner region that is acid-base unstable and a cladding that is acid-base resistant.

8. The method as in claim 6, wherein the cladding layer comprises diamond, graphitic carbon, silicon carbide, boron nitride, tungsten carbide, niobium carbide, or combinations thereof.

9. The method as in claim 1, wherein the plurality of composite particles exhibits a particle size of at least about 0.5 µm and a surface area of at least about 5.0 $m^2$/g.

10. The method as in claim 1, wherein the plurality of acid-base-resistant core particles exhibits a particle size of at least an order of magnitude larger than the plurality of acid-base-resistant shell particles.

11. The method as in claim 1, wherein the polymer material is coated on the at least a portion of the plurality of acid-base-resistant shell particles before the act of adhering.

12. The method as in claim 1, wherein the polymer material is coated on the at least a portion of the plurality of acid-base-resistant core particles before the act of adhering.

13. The method as in claim 1, wherein the acts of coating and adhering comprise:
   immersing the plurality of acid-base-resistant core particles in a polymer solution to form polymer-functionalized core particles;

immersing the polymer-functionalized core particles in a suspension of a first portion of the plurality of shell particles to yield a plurality of intermediate composite particles;

immersing the intermediate composite particles in a polymer solution to yield polymer-functionalized intermediate composite particles;

immersing the polymer-functionalized intermediate composite particles in a second portion of the plurality of acid-base-resistant shell particles to yield composite particles having a plurality of layers of shell particles; and cross-linking the polymeric material.

14. The method as in claim 13, further comprising bonding the plurality of composite particles together.

15. The method as in claim 13, wherein the plurality of acid-base-resistant shell particles comprise nanodiamond particles with a particle size of less than about 1 µm.

16. The method as in claim 13, wherein the acts of coating and adhering comprise:

forming a bed of the plurality of acid-base-resistant core particles in a vessel;

flowing a liquid polymeric material through the bed to coat the plurality of acid-base-resistant core particles thereof with the polymer material; and flowing the plurality of acid-base-resistant shell particles through the bed to adhere the portion of the plurality of acid-base-resistant shell particles to the each of the plurality of acid-base-resistant core particles.

* * * * *